United States Patent
Gibbons et al.

(10) Patent No.: US 11,844,362 B2
(45) Date of Patent: *Dec. 19, 2023

(54) MICROBIAL-BASED PROCESS FOR HIGH-QUALITY PROTEIN CONCENTRATE

(71) Applicant: THE SOUTH DAKOTA BOARD OF REGENTS, AS GOVERNING BOARD FOR SOUTH DAKOTA STATE UNIVERSITY, Pierre, SD (US)

(72) Inventors: William Gibbons, Brookings, SD (US); Michael Brown, Brookings, SD (US)

(73) Assignee: The South Dakota of Regents, As Governing Board for South Dakota State University, Pierre, SD (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/243,315

(22) Filed: Apr. 28, 2021

(65) Prior Publication Data
US 2021/0251256 A1    Aug. 19, 2021

Related U.S. Application Data

(63) Continuation of application No. 16/918,831, filed on Jul. 1, 2020, now Pat. No. 11,147,292, which is a continuation of application No. 15/151,599, filed on May 11, 2016, now abandoned, which is a continuation of application No. 13/691,843, filed on Dec. 2, 2012, now Pat. No. 9,370,200.

(60) Provisional application No. 61/566,557, filed on Dec. 2, 2011, provisional application No. 61/566,487, filed on Dec. 2, 2011.

(51) Int. Cl.
| A23K 40/25 | (2016.01) |
| A23J 1/12 | (2006.01) |
| A23K 40/20 | (2016.01) |
| A23K 10/14 | (2016.01) |
| A23K 50/80 | (2016.01) |
| A23J 1/14 | (2006.01) |
| A23K 20/147 | (2016.01) |
| A23K 10/38 | (2016.01) |

(52) U.S. Cl.
CPC .............. *A23J 1/125* (2013.01); *A23J 1/14* (2013.01); *A23J 1/148* (2013.01); *A23K 10/14* (2016.05); *A23K 10/38* (2016.05); *A23K 20/147* (2016.05); *A23K 40/20* (2016.05); *A23K 40/25* (2016.05); *A23K 50/80* (2016.05); *Y02A 40/818* (2018.01)

(58) Field of Classification Search
CPC ... A23J 1/125; A23J 1/14; A23J 1/148; A23K 10/14; A23K 50/80
USPC .......................................................... 426/53
See application file for complete search history.

(56) References Cited

U.S. PATENT DOCUMENTS

| 3,958,015 A * | 5/1976 | Gay | .................. A23C 11/10 |
| | | | 435/197 |
| 2010/0069289 A1* | 3/2010 | Elvebo | .................. A61P 1/00 |
| | | | 514/18.7 |

OTHER PUBLICATIONS

Seo, H. et al. Bioresource Technol. 95: 293-299 (Year: 2004).*

* cited by examiner

*Primary Examiner* — Hamid R Badr

(57) ABSTRACT

The present invention describes a bio-based process to produce high quality protein concentrate (HQPC) by converting plant derived celluloses into bioavailable protein via aerobic incubation, including the use of such HQPC so produced as a nutrient, including use as a fish meal replacement in aquaculture diets.

12 Claims, 5 Drawing Sheets

US 11,844,362 B2

MICROBIAL-BASED PROCESS FOR HIGH-QUALITY PROTEIN CONCENTRATE

CROSS REFERENCE TO RELATED APPLICATION

This application is a continuation of U.S. Ser. No. 16/918,831, filed Jul. 1, 2020 under 35 U.S.C. § 120, which is a continuation of U.S. Ser. No. 15/151,599, filed May 11, 2016 under 35 U.S.C. § 120, which is a continuation of U.S. Ser. No. 13/691,843, filed Dec. 2, 2012 under 35 U.S.C. § 120, now U.S. Pat. No. 9,370,200, which claims benefit under 35 U.S.C. § 119(e) to U.S. Provisional Application No. 61/556,487, filed on Dec. 2, 2011, and U.S. Provisional Application No. 61/566,557, filed on Dec. 2, 2011, each of which is incorporated by reference herein in its entirety.

This work was made with Governmental support from the National Science Foundation under contract DBI-1005068. The Government has certain rights in this invention.

BACKGROUND OF THE INVENTION

Field of the Invention

The invention generally relates to incubation processes, and specifically microbial-based aerobic incubation processes to produce high quality protein concentrates, including products made therefrom and use of such products in the formulation of nutrient feeds.

Background Information

In 2008, approximately 28% of the world's wild, marine fish stocks were overexploited and 52% were fully exploited, even as the demand for per capita consumption of fish and shellfish products have increased with the increasing human population. With dwindling wild fish stocks, in an effort to meet this increased demand, commercial aquaculture production has increased dramatically. However, one of the primary constituents of dietary formulations for aquaculture, fish meal protein, is also derived from wild capture fisheries. It is estimated that at least 6.7 mmt of fish meal will be required to support commercial aquaculture production by 2012. This is clearly an unsustainable trend.

Lower cost, more sustainable plant-derived sources of protein have been used to partially replace fish meal in aquaculture diets. Defatted soybean meal (SBM, 42-48% protein) has commonly been used to replace up to 20% of total protein in grower diets for several species, while soy protein concentrate (SPC, 65% protein) has been tested successfully at higher total protein replacement levels, largely governed by the trophic status of the species. These soybean products provide high protein and relative good amino acid profiles, but are still deficient in some critical amino acids (e.g., taurine) required by carnivorous marine fishes. SPC can be used at higher levels than soybean meal, primarily because the solvent extraction process used to produce SPC removes anti-nutritional factors (e.g., oligosaccharides) and thereby increases protein bioavailability. In addition, a thermal step has been used to inactivate heat-labile antigenic factors. The primary limitations of the current solvent extraction process are its cost, the lack of use for the oligosaccharides removed in the process, and quality issues that frequently limit inclusion to 50% of total protein in the diet. Further, processing of soy material into soybean meal or soy protein concentrates can be environmentally problematic (e.g., problems with disposal of chemical waste associated with hexane-extraction).

Corn co-products, including dried distiller's grains with solubles (DDGS), have also been evaluated in aquaculture diets at fish meal replacement levels of up to 20%. DDGS has lower protein (28-32%) and more fiber than soy products, but is typically priced at ~50% of the value of defatted soybean meal. Some ethanol plants have incorporated a dry fractionation process to remove part of the fiber and oil prior to the conversion process, resulting in a dry-frac DDGS of up to 42% protein. While this product has been used to replace 20-40% of fish meal in aquaculture feeds, there remains the need for a higher protein, more digestible DDGS aqua feed product. Such a product would be especially attractive if the protein component had higher levels of critical amino acids such as taurine, lysine, methionine, and cysteine.

Therefore, a plant-derived protein source which is cost-effective and "green," and that is of a high-enough quality to fully or substantially replace more of the fish meal in an aquaculture diet is needed.

SUMMARY OF THE INVENTION

The present disclosure relates to an organic, microbially-based system to convert plant material into a highly digestible, concentrated protein source that also contains a microbial gum (exopolysaccharide) binder, including such a concentrated source which is suitable for use as a feed for animals used for human consumption.

In embodiments, a composition containing a non-animal based protein concentrate is disclosed, where the composition contains at least 55% protein content and no detectable stachyose on a dry matter basis. In one aspect, the composition contains *Aureobasidium pullulans* deposited strain NRRL No. 50792, NRRL No. 50793, NRRL No. 50794, NRRL No. 50795, or a combination thereof.

In one aspect, the non-animal based protein concentrate is isolated from cereal grain and oilseed plant material including, but not limited to, soybeans, peanuts, Rapeseeds, canola, sesame seeds, barley, cottonseeds, palm kernels, grape seeds, olives, safflowers, sunflowers, copra, corn, coconuts, linseed, hazelnuts, wheat, rice, potatoes, cassavas, legumes, camelina seeds, mustard seeds, germ meal, corn gluten meal, distillery/brewery by-products, portions and combinations thereof.

In another aspect, the protein content of the composition is in the range of from about 56% to about 90% on a dry matter basis produced by a process including extruding plant material at above room temperature to form a mash; adding one or more cellulose-deconstructing enzymes to release sugars into the mash; inoculating the enzyme-treated mash with at least one microbe, which microbe converts released sugars into proteins and exopolysaccharides; precipitating the resulting proteins, microbes, and exopolysaccharides with ethanol or a flocculent; recovering the precipitated material via hydrodynamic force; and drying said precipitated material.

In a related aspect, the at least one microbe includes, but is not limited to, *Aureobasidium pullulans, Sclerotium glucanicum, Sphingomonas paucimobilis, Ralstonia eutropha, Rhodospirillum rubrum, Kluyveromyces* spp, *Pichia* spp, *Trichoderma reesei, Pleurotus ostreatus, Rhizopus* spp, and combinations thereof.

In one aspect, the plant material is from soybeans in the form of soy flakes or soy meal. In another aspect, the plant material is from oil seeds or their de-oiled meals. In another aspect, the plant material is from distiller's dried grain with solubles (DDGS).

In one aspect, the protein concentrate includes at least 0.1 g hydroxylysine/100 g of concentrate.

In one embodiment, an animal feed comprising a non-animal based protein concentrate is disclosed, where the composition includes at least about 1.25 g of lipid/100 g composition, where the composition contains no detectable stachyose or raffinose and at least 55% protein content on a dry matter basis, and where the composition includes at least 35% of said animal feed by weight.

In a related aspect, the composition is a complete replacement for animal-based fishmeal in a fish feed. In a further related aspect, fish feed is formulated for fish including, but not limited to, Siberian sturgeon, Sterlet sturgeon, Starry sturgeon, White sturgeon, Arapaima, Japanese eel, American eel, Short-finned eel, Long-finned eel, European eel, *Chanos chanos*, Milkfish, Bluegill sunfish, Green sunfish, White crappie, Black crappie, Asp, *Catla*, Goldfish, Crucian carp, Mud carp, Mrigal carp, Grass carp, Common carp, Silver carp, Bighead carp, Orangefin labeo, Roho labeo, Hoven's carp, Wuchang bream, Black carp, Golden shiner, Nilem carp, White amur bream, Thai silver barb, Java, Roach, Tench, Pond loach, Bocachico, Dorada, Cachama, Cachama Blanca, Paco, Black bullhead, Channel catfish, Bagrid catfish, Blue catfish, Wels catfish, *Pangasius* (Swai, Tra, Basa) catfish, Striped catfish, Mudfish, Philippine catfish, Hong Kong catfish, North African catfish, Bighead catfish, Sampa, South American catfish, Atipa, Northern pike, Ayu sweetfish, Vendace, Whitefish, Pink salmon, Chum salmon, Coho salmon, Masu salmon, Rainbow trout, Sockeye salmon, Chinook salmon, Atlantic salmon, Sea trout, Arctic char, Brook trout, Lake trout, Atlantic cod, Pejerrey, Lai, Common snook, Barramundi/Asian sea bass, Nile perch, Murray cod, Golden perch, Striped bass, White bass, European seabass, Hong Kong grouper, Areolate grouper, Greasy grouper, Spotted coralgrouper, Silver perch, White perch, Jade perch, Largemouth bass, Smallmouth bass, European perch, Zander (Pike-perch), Yellow Perch, Sauger, Walleye, Bluefish, Greater amberjack, Japanese amberjack, Snubnose pompano, Florida pompano, Palometa pompano, Japanese jack mackerel, Cobia, Mangrove red snapper, Yellowtail snapper, Dark seabream, White seabream, Crimson seabream, Red seabream, Red porgy, Goldlined seabream, Gilthead seabream, Red drum, Green terror, Blackbelt cichlid, Jaguar guapote, Mexican mojarra, Pearlspot, Three spotted tilapia, Blue tilapia, Longfin tilapia, Mozambique tilapia, Nile tilapia, Tilapia, Wami tilapia, Blackchin tilapia, Redbreast tilapia, Redbelly tilapia, Golden grey mullet, Largescale mullet, Gold-spot mullet, Thinlip grey mullet, Leaping mullet, Tade mullet, Flathead grey mullet, White mullet, Lebranche mullet, Pacific fat sleeper, Marble goby, Whitespotted spinefoot, Goldlined spinefoot, Marbled spinefoot, Southern bluefin tuna, Northern bluefin tuna, Climbing perch, Snakeskin gourami, Kissing gourami, Giant gourami, Snakehead, Indonesian snakehead, Spotted snakehead, Striped snakehead, Turbot, Bastard halibut (Japanese flounder), Summer Flounder, Southern flounder, Winter flounder, Atlantic Halibut, Greenback flounder, Common sole, and combinations thereof.

In one aspect, the fish feed effects greater performance in one or more performance aspects including, but not limited to, growth, weight gain, protein efficiency ratio, feed conversion ratio, total consumption, survival, and Fulton's condition factor compared to equivalent fish feed comprising animal-based fishmeal or soy protein concentrate.

In another aspect, the fish feed effects the performance aspects at a crude protein content that is less than or equal to the protein content of equivalent fish feed comprising animal-based fishmeal or soy protein concentrate.

In one aspect, the animal feed is supplemented with lysine, methionine, lipids, biotin, choline, niacin, ascorbic acid, inositol, pantothenic acid, folic acid, pyridoxine, riboflavin, thiamin, vitamin A, vitamin B12, vitamin D, vitamin E, vitamin K, calcium, phosphorus, potassium, sodium, magnesium, manganese, aluminum, iodine, cobalt, zinc, iron, selenium or a combination thereof.

In another embodiment, a method of producing a non-animal based protein concentrate is disclosed including extruding plant material at above room temperature to form a mash and transferring the mash to a biorector; adding one or more cellulose-deconstructing enzymes to release sugars into the mash in the bioreactor; inoculating the enzyme treated mash with at least one microbe, which microbe converts released sugars into proteins and exopolysaccharides; precipitating the resulting proteins, microbes, and exopolysaccharides with ethanol, a flocculent or a combination thereof; recovering the precipitated material via hydrodynamic force; and drying the precipitated material.

In a related aspect, extrusion is carried out at between about 50° C. to about 170° C., at a compression ratio of about 3:1, and at a screw speed sufficient to provide a shearing effect against ridged channels on both sides of an extrusion barrel.

In another related aspect, the method includes mixing the extruded materials with water to achieve a solid loading rate of at least 5% in the bioreactor; and optionally, autoclaving and cooling the diluted extruded materials, where the one or more cellulose-deconstructing enzymes are selected from the group consisting of endo-xylanase and beta-xylosidase, glycoside hydrolase, ß-glucosidases, hemicellulase activities, and combinations thereof.

In one related aspect, the method includes reducing the temperature of the enzyme treated mash to between about 30° C. to about 37° C.; inoculating the cooled mash with 2% (v/v) of a 24 hour culture of the at least one microbe, where the at least one microbe includes, but is not limited to *Aureobasidium pullulans, Sclerotium glucanicum, Sphingomonas paucimobilis, Ralstonia eutropha, Rhodospirillum rubrum, Kluyveromyces* spp, *Pichia* spp, *Trichoderma reesei, Pleurotus ostreatus, Rhizopus* spp, and combinations thereof; optionally aerating the inoculated mash at about 0.05 L/L/min; and incubating until utilization of sugars ceases or after about 96 to 120 hours incubation in the presence of the at least one microbe.

In one aspect, the method includes adding about 0.6 L ethanol/L of mash; centrifuging the ethanol treated mash; recovering the ethanol; optionally recovering fine suspended particles, recovering centrifuged solids; and drying the recovered centrifuge solids. In another aspect, the supernatant may be dried, dried solids recovered, and thereafter mixed with the centrifuge solids.

In one embodiment, a biologically pure culture of *Aureobasidium pullulans* strain selected from the group consisting of NRRL No. 50792, NRRL No. 50793, NRRL No. 50794, and NRRL No. 50795 is disclosed.

DETAILED DESCRIPTION OF THE INVENTION

Figure 1:
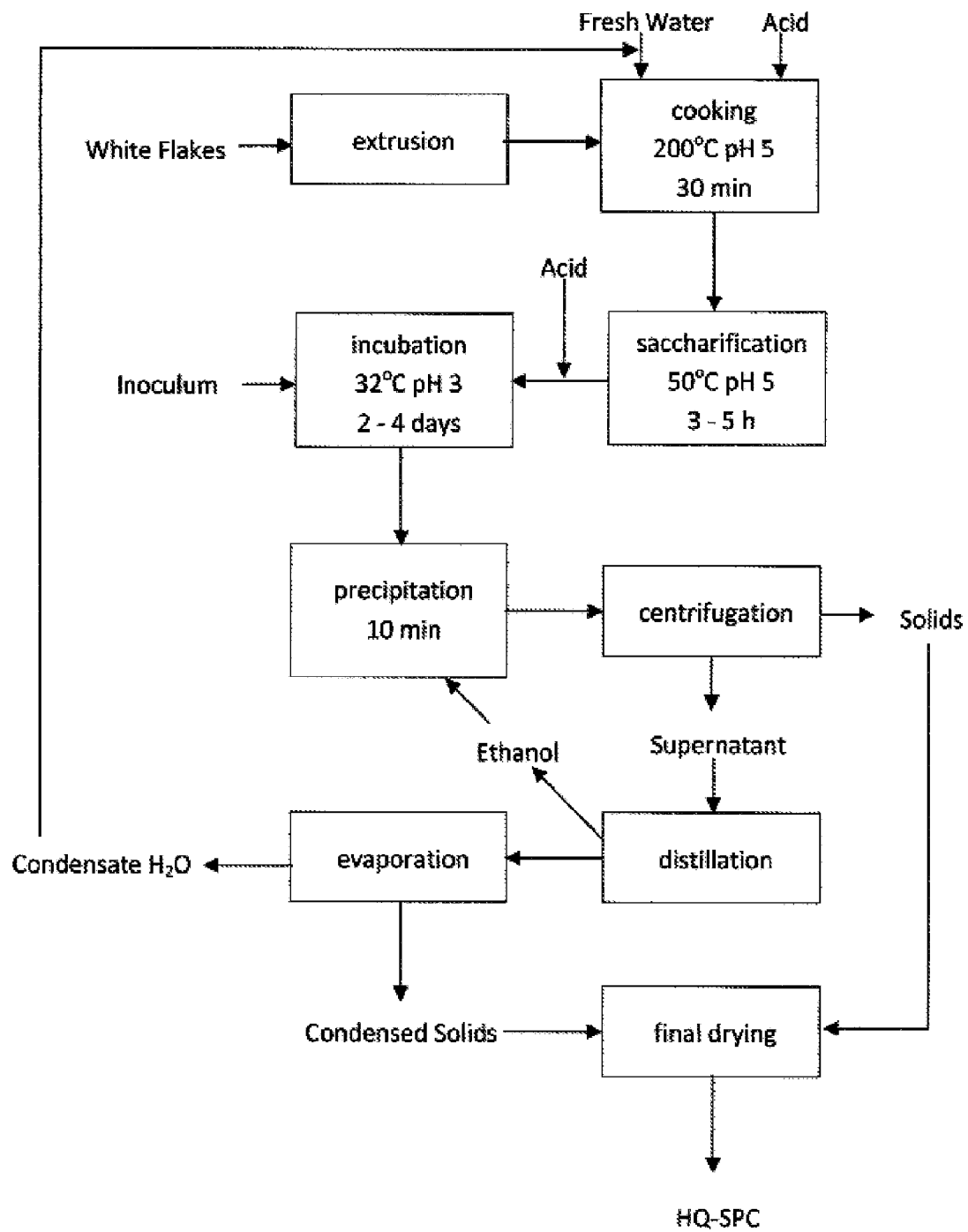
FIG. 1 shows a flow chart for the HQSPC conversion process.

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "a nucleic acid" includes one or more nucleic acids, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

As used herein, "about," "approximately," "substantially" and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term and "substantially" and "significantly" will mean plus or minus >10% of the particular term.

As used herein, the term "animal" means any organism belonging to the kingdom Animalia and includes, without limitation, humans, birds (e.g. poultry), mammals (e.g. cattle, swine, goal, sheep, cat, dog, mouse and horse) as well as aquaculture organisms such as fish (e.g. trout, salmon, perch), mollusks (e.g. clams) and crustaceans (e.g. lobster and shrimp).

Use of the term "fish" includes all vertebrate fish, which may be bony or cartilaginous fish.

As used herein "non-animal based protein" means that the protein concentrate comprises at least 0.81 g of crude fiber/100 g of composition (dry matter basis), which crude fiber is chiefly cellulose and lignin material obtained as a residue in the chemical analysis of vegetable substances.

As used herein, "incubation process" means the provision of proper conditions for growth and development of bacteria or cells, where such bacteria or cells use biosynthetic pathways to metabolize various feed stocks. In embodiments, the incubation process may be carried out, for example, under aerobic conditions. In other embodiments, the incubation process may include fermentation.

As used herein, the term "incubation products" means any residual substances directly resulting from an incubation process/reaction. In some instances, an incubation product contains microorganisms such that it has a nutritional content enhanced as compared to an incubation product that is deficient in such microorganisms. The incubation products may contain suitable constituent(s) from an incubation broth. For example, the incubation products may include dissolved and/or suspended constituents from an incubation broth. The suspended constituents may include undissolved soluble constituents (e.g., where the solution is supersaturated with one or more components) and/or insoluble materials present in the incubation broth. The incubation products may include substantially all of the dry solids present at the end of an incubation (e.g., by spray drying an incubation broth and the biomass produced by the incubation) or may include a portion thereof. The incubation products may include crude material from incubation where a microorganism may be fractionated and/or partially purified to increase the nutrient content of the material.

As used herein, a "conversion culture" means a culture of microorganisms which are contained in a medium that comprises material sufficient for the growth of the microorganisms, e.g., water and nutrients. The term "nutrient" means any substance with nutritional value. It can be part of an animal feed or food supplement for an animal. Exemplary nutrients include but are not limited to proteins, peptides, fats, fatty acids, lipids, water and fat soluble vitamins, essential amino acids, carbohydrates, sterols, enzymes and trace minerals, such as, phosphorus, iron, copper, zinc, manganese, magnesium, cobalt, iodine, selenium, molybdenum, nickel, fluorine, vanadium, tin, and silicon.

Conversion is the process of culturing microorganisms in a conversion culture under conditions suitable to convert protein/carbohydrate/polysaccharide materials, for example, soybean material into a high-quality protein concentrate. Adequate conversion means utilization of 90% or more of specified carbohydrates to produce microbial cell mass and/or exopolysaccharide. In embodiments, conversion may be aerobic or anaerobic.

As used herein a "flocculent" or "clearing agent" is a chemical that promotes colloids to come out of suspension through aggregation, and includes, but is not limited to, a multivalent ion and polymer. In embodiments, such a flocculent/clearing agent may include bioflocculents such as exopolysaccharides.

A large number of plant protein sources may be used in connection with the present disclosure as feed stocks for conversion. The main reason for using plant proteins in the feed industry is to replace more expensive protein sources, like animal protein sources. Another important factor is the danger of transmitting diseases through feeding animal proteins to animals of the same or related species. Examples for plant protein sources include, but are not limited to, protein from the plant family Fabaceae as exemplified by soybean and peanut, from the plant family Brassiciaceae as exemplified by canola, cottonseed, the plant family Asteraceae including, but not limited to sunflower, and the plant family Arecaceae including copra. These protein sources, also commonly defined as oilseed proteins may be fed whole, but they are more commonly fed as a by-product after oils have been removed. Other plant protein sources include plant protein sources from the family Poaceae, also known as Gramineae, like cereals and grains especially corn, wheat and rice or other staple crops such as potato, cassava, and legumes (peas and beans), some milling by-products including germ meal or corn gluten meal, or distillery/brewery by-products. In embodiments, feed stocks for proteins include, but are not limited to, plant materials from soybeans, peanuts, Rapeseeds, barley, canola, sesame seeds, cottonseeds, palm kernels, grape seeds, olives, safflowers, sunflowers, copra, corn, coconuts, linseed, hazelnuts, wheat, rice, potatoes, cassavas, legumes, camelina seeds, mustard seeds, germ meal, corn gluten meal, distillery/brewery by-products, and combinations thereof.

In the fish farming industry the major fishmeal replacers with plant origin reportedly used, include, but are not limited to, soybean meal (SBM), maize gluten meal, Rapeseed/canola (*Brassica* sp.) meal, lupin (*Lupinus* sp. like the proteins in kernel meals of de-hulled white (*Lupinus albus*), sweet (*L. angustifolius*) and yellow (*L. luteus*) lupins, Sunflower (*Helianthus annuus*) seed meal, crystalline amino acids; as well as pea meal (*Pisum sativum*), Cottonseed (*Gossypium* sp.) meal, Peanut (groundnut; *Arachis hypogaea*) meal and oilcake, soybean protein concentrate, corn (*Zea mays*) gluten meal and wheat (*Triticum aestivum*) gluten, Potato (*Solanum tuberosum* L.) protein concentrate as well as other plant feedstuffs like Moringa (*Moringa oleifera* Lam.) leaves, all in various concentrations and combinations.

The protein sources may be in the form of non-treated plant materials and treated and/or extracted plant proteins. As an example, heat treated soy products have high protein digestibility.

A protein material includes any type of protein or peptide. In embodiments, soybean material or the like may be used such as whole soybeans. Whole soybeans may be standard, commoditized soybeans; soybeans that have been genetically modified (GM) in some manner; or non-GM identity preserved soybeans. Exemplary GM soybeans include, for example, soybeans engineered to produce carbohydrates other than stachyose and raffinose. Exemplary non-GM soybeans include, for example, Schillinger varieties that are line bred for low oil, low carbohydrates, and low trypsin inhibition.

Other types of soybean material include soy protein flour, soy protein concentrate, soybean meal and soy protein isolate, or mixtures thereof. The traditional processing of whole soybean into other forms of soy protein such as soy protein flours, soy protein concentrates, soybean meal and soy protein isolates, includes cracking the cleaned, raw whole soybean into several pieces, typically six (6) to eight (8), to produce soy chips and hulls, which are then removed. Soy chips are then conditioned at about 60° C. and flaked to about 0.25 millimeter thickness. The resulting flakes are then extracted with an inert solvent, such as a hydrocarbon solvent, typically hexane, in one of several types of countercurrent extraction systems to remove the soybean oil. For soy protein flours, soy protein concentrates, and soy protein isolates, it is important that the flakes be desolventized in a manner which minimizes the amount of cooking or toasting of the soy protein to preserve a high content of water-soluble soy protein. This is typically accomplished by using vapour desolventizers or flash desolventizers. The flakes resulting from this process are generally referred to as "edible defatted flakes" or "white soy(bean) flakes."

White soy bean flakes, which are the starting material for soy protein flour, soy protein concentrate, and soy protein isolate, have a protein content of approximately 50%. White soybean flakes are then milled, usually in an open-loop grinding system, by a hammer mill, classifier mill, roller mill or impact pin mill first into grits, and with additional grinding, into soy flours with desired particle sizes. Screening is typically used to size the product to uniform particle size ranges, and can be accomplished with shaker screens or cylindrical centrifugal screeners. Other oil seeds may be processed in a similar manner.

In embodiments, distiller's dried grain solubles (DDGS) may be used. DDGS are currently manufactured by the corn ethanol industry. Traditional DDGS comes from dry grind facilities, in which the entire corn kernel is ground and processed. DDGS in these facilities typically contains 28-32% protein.

The protein sources may be in the form of non-treated plant materials and treated and/or extracted plant proteins. As an example, heat treated soy products have high protein digestibility. Still, the upper inclusion level for full fat or defatted soy meal inclusion in diets for carnivorous fish is between an inclusion level of 20 to 30%, even if heat labile antinutrients are eliminated. In fish, soybean protein has shown that feeding fish with protein concentration inclusion levels over 30% causes intestinal damage and in general reduces growth performance in different fish species. In fact, most fish farmers are reluctant to use more than 10% plant proteins in the total diet due to these effects.

The present invention solves this problem and allows for plant protein inclusion levels of up to 40 or even 50%, depending on, amongst other factors, the animal species being fed, the origin of the plant protein source, the ratio of different plant protein sources, the protein concentration and the amount, origin, molecular structure and concentration of the glucan and/or mannan. In embodiments, the plant protein inclusion levels are up to 40%, preferably up to 20 or 30%. Typically the plant protein present in the diet is between 5 and 40%, preferably between 10 or 15 and 30%. These percentages define the percentage amount of a total plant protein source in the animal feed or diet, this includes fat, ashes etc. In embodiments, pure protein levels are up to 50%, typically up to 45%, in embodiments 5-95%.

The proportion of plant protein to other protein in the total feed or diet may be 5:95 to 95:5, 15:85 to 50:50, or 25:75 to 45:55.

Microorganisms

The disclosed microorganisms must be capable of converting carbohydrates and other nutrients into a high-quality protein concentrate in a conversion culture. In embodiments, the microorganism is a yeast-like fungus. An example of a yeast-like fungus is *Aurobasidium pullulans*. Other example microorganisms include yeast such as *Kluyveromyces* and *Pichia* spp, Lactic acid bacteria, *Trichoderma reesei*, *Pleurotus ostreatus*, *Rhizopus* spp, and many types of lignocellulose degrading microbes. Generally, exemplary microbes include those microbes that can metabolize stachyose, raffinose, xylose and other sugars. However, it is within the abilities of a skilled artisan to pick, without undue experimentation, other appropriate microorganisms based on the disclosed methods.

In embodiments, the microbial organisms that may be used in the present process include, but are not limited to, *Aureobasidium pullulans, Sclerotium glucanicum, Sphingomonas paucimobilis, Ralstonia eutropha, Rhodospirillum rubrum, Kluyveromyces* and *Pichia* spp, *Trichoderma reesei, Pleurotus ostreatus, Rhizopus* spp, and combinations thereof. In embodiments, the microbe is *Aureobasidium pullulans*.

In embodiments, the *A. pullulans* is adapted to various environments/stressors encountered during conversion. In embodiments, an *A. pullulans* strain denoted by NRRL deposit No. 50793, which was deposited with the Agricultural Research Culture Collection (NRRL), Peoria, Ill., under the terms of the Budapest Treaty on Nov. 30, 2012, exhibits lower gum production and is adapted to DDGC. In embodiments, an *A. pullulans* strain denoted by NRRL deposit No. 50792, which was deposited with the Agricultural Research Culture Collection (NRRL), Peoria, Ill., under the terms of the Budapest Treaty on Nov. 30, 2012, is adapted to high levels of the antibiotic tetracycline (e.g., from about 75 µg/ml tetracycline to about 200 µg/ml tetracycline). In embodiments, an *A. pullulans* strain denoted by NRRL deposit No. 50794, which was deposited with the Agricultural Research Culture Collection (NRRL), Peoria, Ill., under the terms of the Budapest Treaty on Nov. 30, 2012, is adapted to high levels of the antibiotic LACTROL® (e.g., from about 2 µg/ml virginiamycin to about 6 µg/ml virginiamycin). In embodiments, an *A. pullulans* strain denoted by NRRL deposit No. 50795, which was deposited with the Agricultural Research Culture Collection (NRRL), Peoria, Ill., under the terms of the Budapest Treaty on Nov. 30, 2012, is acclimated to condensed corn solubles.

Conversion Culture

In exemplary embodiments, after pretreatment, the protein material (such as extruded soy white flakes) may be blended with water at a solid loading rate of at least 5%, with pH adjusted to 4.5-5.5. Then appropriate dosages of hydrolytic enzymes may be added and the slurry incubated with agitation at 150-250 rpm at 50° C. for 3-24 h. After cooling to 35° C., an inoculum of *A. pullulans* may be added and the culture may be incubated for an additional 72-120 h, or until the carbohydrates are consumed. During incubation, sterile air may be sparged into the reactor at a rate of 0.5-1 L/L/h. In embodiments, the conversion culture undergoes conversion by incubation with the soybean material for less than about 96 hours. In embodiments, the conversion culture will be incubated for between about 96 hours and about 120 hours. In embodiments, the conversion culture may be incubated for more than about 120 hours. The conversion culture may be incubated at about 35° C.

In embodiments, the pH of the conversion culture, while undergoing conversion, may be about 4.5 to about 5.5. In embodiments, the pH of the conversion culture may be less than 4.5 (e.g., at pH 3). In embodiments, the conversion culture may be actively aerated such as is disclosed in Deshpande et al., *Aureobasidiumpullulans in applied microbiology: A status report*, Enzyme and Microbial Technology (1992), 14(7):514.

The high-quality protein concentrate (HQPC), as well as pullulan and siderophores, may be recovered from the conversion culture following the conversion process by optionally alcohol precipitation and centrifugation. An example alcohol is ethanol, although the skilled artisan understands that other alcohols should work. In embodiments, salts may also be used to precipitate. Exemplary salts may be salts of potassium, sodium and magnesium chloride. In embodiments, a polymer or mutilvalent ions may be used alone or in combination with the alcohol.

In embodiments, final protein concentrations solids recovery may be modulated by varying incubation times. For example, about 75% protein may be achieved with a 14 day incubation, where the solids recovery is about 16-20%. In embodiments, incubation for 2-2.5 days increase solids recovery to about 60-64%, and protein level of 58-60% in the HQPC. In embodiments, 4-5 day incubation may maximize both protein content (e.g., but not limited to greater than about 70%) and solids recovery (e.g., but not limited to greater than about 60%). These numbers may be greater or lower, depending on the feed stock. In embodiments, the protein concentrates (i.e., HQSPC or HP-DDGS) may have a specific lipid:protein ratio, e.g., at about 0.010:1 to about 0.03:1, about 0.020:1 to about 0.025:1 or about 0.021:1 to about 0.023:1.

In embodiments, feed stocks may be extruded in a single screw extruder (e.g., BRABENDER PLASTI-CORDER EXTRUDER Model PL2000, Hackensack, NJ) with a barrel length to screw diameter of 1:20 and a compression ratio of 3:1, although other geometries and ratios may be used. Feed stocks may be adjusted to about 10% to about 15% moisture, to about 15%, or to about 25% moisture. The temperature of feed, barrel, and outlet sections of extruder may be held at between about 40° C. to about 50° C. or to about 50° C. to about 100° C., about 100° C. to about 150° C., about 150° C. to about 170° C., and screw speed may be set at about 50 rpm to about 75 rpm or about 75 rpm to about 100 rpm or about 100 rpm to about 200 rpm to about 250 rpm. In embodiments, the screw speed is sufficient to provide a shearing effect against the ridged channels on both sides of a barrel. In embodiments, screw speed is selected to maximize sugar release.

In embodiments, extruded feed stock materials (e.g., plant proteins or DDGS) may be mixed with water to achieve a solid loading rate of at least 5% in a reactor (e.g., a 5 L NEW BRUNSWICK BIOFLO 3 BIOREACTOR; 3-4 L working volume). The slurry may be autoclaved, cooled, and then saccharified by subjection to enzymatic hydrolysis using a cocktail of enzymes including, but not limited to, endo-xylanase and beta-xylosidase, Glycoside Hydrolase, ß-glucosidases, hemicellulase activities. In one aspect, the cocktail of enzymes includes NOVOZYME® enzymes. Dosages to be may include 6% CELLICCTEK® (per gm glucan), 0.3% CELLICHTEK® (per gm total solids), and 0.15% NOVOZYME 960® (per gm total solids). Saccharification may be conducted for about 12 h to about 24 h at 40° to about 50° C. and about 150 rpm to about 200 rpm to solubilize the fibers and oligosaccharides into simple sugars. The temperature may then be reduced to between about 30° C. to about 37° C., in embodiments to about 35° C., and the slurry may be inoculated with 2% (v/v) of a 24 h culture of the microbe. The slurry may be aerated at 0.5 L/L/min and incubation may be continued until sugar utilization ceases or about 96 h to about 120 h. In fed-batch conversions more extruded feed stock may be added during either saccharification and/or the microbial conversion phase.

In embodiments, the feed stock and/or extrudate may be treated with one or more antibiotics (e.g., but not limited to, tetracycline, penicillin, erythromycin, tylosin, virginiamycin, and combinations thereof) before inoculation with the converting microbe to avoid, for example, contamination by unwanted bacteria strains.

During incubation, samples may be removed at 6-12 h intervals. Samples for HPLC analysis may be boiled, centrifuged, filtered (e.g., through 0.22-µm filters), placed into autosampler vials, and frozen until analysis. In embodiments, samples may be assayed for carbohydrates and organic solvents using a WATERS HPLC system, although other HPLC systems may be used. Samples may be subjected to plate or hemocytometer counts to assess microbial populations. Samples may also be assayed for levels of cellulose, hemicellulose, and pectin using National Renewable Energy Laboratory procedures.

Dietary Formulations

In exemplary embodiments, the high-quality protein concentrate recovered from the conversion culture that has undergone conversion is used in dietary formulations. In embodiments, the recovered high-quality protein concentrate (HQPC) will be the primary protein source in the dietary formulation. Protein source percentages in dietary formulations are not meant to be limiting and may include 24 to 80% protein. In embodiments, the high-quality protein concentrate (HQPC) will be more than about 50%, more than about 60%, or more than about 70% of the total dietary formulation protein source. Recovered HQPC may replace protein sources such as fish meal, soybean meal, wheat and corn flours and glutens and concentrates, and animal byproduct such as blood, poultry, and feather meals. Dietary formulations using recovered HQPC may also include supplements such as mineral and vitamin premixes to satisfy remaining nutrient requirements as appropriate.

In certain embodiments, performance of the HQPC, such as high-quality soy protein concentrate (HQSPC) or high-quality DDGS (HP-DDGS), may be measured by comparing the growth, feed conversion, protein efficiency, and survival of animal on a high-quality protein concentrate dietary formulation to animals fed control dietary formulations, such as fish-meal. In embodiments, test formulations contain consistent protein, lipid, and energy contents. For example, when the animal is a fish, viscera (fat deposition) and organ (liver and spleen) characteristics, dress-out percentage, and fillet proximate analysis, as well as intestinal histology (enteritis) may be measured to assess dietary response.

As is understood, individual dietary formulations containing the recovered HQPC may be optimized for different kinds of animals. In embodiments, the animals are fish grown in commercial aquaculture. Methods for optimization of dietary formulations are well-known and easily ascertainable by the skilled artisan without undue experimentation.

Complete grower diets may be formulated using HQPC in accordance with known nutrient requirements for various animal species. In embodiments, the formulation may be used for yellow perch (e.g., 42% protein, 8% lipid). In embodiments, the formulation may be used for rainbow trout (35% protein, 16% lipid). In embodiments, the formulation may be used for any one of the animals recited supra.

Basal mineral and vitamin premixes for plant-based diets may be used to ensure that micro-nutrient requirements will be met. Any supplements (as deemed necessary by analysis) may be evaluated by comparing to an identical formulation without supplementation; thus, the feeding trial may be done in a factorial design to account for supplementation effects. In embodiments, feeding trials may include a fish meal-based control diet and ESPC- and LSPC-based reference diets [traditional SPC (TSPC) is produced from solvent washing soy flake to remove soluble carbohydrate; texturized SPC (ESPC) is produced by extruding TSPC under moist, high temperature; and low-antigen SPC (LSPC) is produced from TSPC by altering the solvent wash and temperature during processing]. Pellets for feeding trials may be produced using the lab-scale single screw extruder (e.g., BRABENDERPLASTI-CORDER EXTRUDER Model PL2000).

Feeding Trials

In embodiments, a replication of four experimental units per treatment (i.e., each experimental and control diet blend) may be used (e.g., about 60 to 120 days each). Trials may be carried out in 110-L circular tanks (20 fish/tank) connected in parallel to a closed-loop recirculation system driven by a centrifugal pump and consisting of a solids sump, and bioreactor, filters (100 µm bag, carbon and ultra-violet). Heat pumps may be used as required to maintain optimal temperatures for species-specific growth. Water quality (e.g., dissolved oxygen, pH, temperature, ammonia and nitrite) may be monitored in all systems.

In embodiments, experimental diets may be delivered according to fish size and split into two to five daily feedings. Growth performance may be determined by total mass measurements taken at one to four weeks (depending upon fish size and trial duration); rations may be adjusted in accordance with gains to allow satiation feeding and to reduce waste streams. Consumption may be assessed biweekly from collections of uneaten feed from individual tanks. Uneaten feed may be dried to a constant temperature, cooled, and weighed to estimate feed conversion efficiency. Protein and energy digestibilities may determined from fecal material manually stripped during the midpoint of each experiment or via necropsy from the lower intestinal tract at the conclusion of a feeding trial. Survival, weight gain, growth rate, health indices, feed conversion, protein and energy digestibilities, and protein efficiency may be compared among treatment groups. Proximate analysis of necropsied fishes may be carried out to compare composition of fillets among dietary treatments. Analysis of amino and fatty acids may be done as needed for fillet constituents, according to the feeding trial objective. Feeding trial responses of dietary treatments may be compared to a control (e.g., fish meal) diet response to ascertain whether performance of HQPC diets meet or exceed control responses.

Statistical analyses of diets and feeding trial responses may be completed with an a priori $\alpha=0.05$. Analysis of performance parameters among treatments may be performed with appropriate analysis of variance or covariance (Proc Mixed) and post hoc multiple comparisons, as needed. Analysis of fish performance and tissue responses may be assessed by nonlinear models.

In embodiments, the present disclosure proposes to convert fibers and other carbohydrates in soy flakes/meal or DDGS into additional protein using, for example, a GRAS-status microbe. A microbial exopolysaccharide (i.e., gum) may also be produced that may facilitate extruded feed pellet formation, negating the need for binders. This microbial gum may also provide immunostimulant activity to activate innate defense mechanisms that protect fish from common pathogens resulting from stressors. Immunoprophylactic substances, such as (3-glucans, bacterial products, and plant constituents, are increasingly used in commercial feeds to reduce economic losses due to infectious diseases and minimize antibiotic use. The microbes of the present disclosure also produce extracellular peptidases, which should increase corn protein digestibility and absorption during metabolism, providing higher feed efficiency and yields. As disclosed herein, this microbial incubation process provides a valuable, sustainable aquaculture feed that is less expensive per unit of protein than SBM, SPC, and fish meal.

As disclosed, the instant microbes may metabolize the individual carbohydrates in soy flakes/meal or DDGS, producing both cell mass (protein) and a microbial gum. Various strains of these microbes also enhance fiber deconstruction. The microbes of the present invention may also convert soy and corn proteins into more digestible peptides and amino acids. In embodiments, the following actions in may be performed: 1) determining the efficiency of using select microbes of the present disclosure to convert pretreated soy protein, oil seed proteins, DDGS and the like, yielding a high quality protein concentrate (HQPC) with a protein concentration of at least 45%, and 2) assessing the effectiveness of HQPC in replacing fish meal. In embodiments, optimizing soy, oil seed, and DDGS pretreatment and conversion conditions may be carried out to improve the performance and robustness of the microbes, test the resultant grower feeds for a range of commercially important fishes, validate process costs and energy requirements, and complete steps for scale-up and commercialization. In embodiments, the HQPC of the present disclosure may be able to replace at least 50% of fish meal, while providing increased growth rates and conversion efficiencies. Production costs should be less than commercial soy protein concentrate (SPC) and substantially less than fish meal (including harvest).

Figure 2:
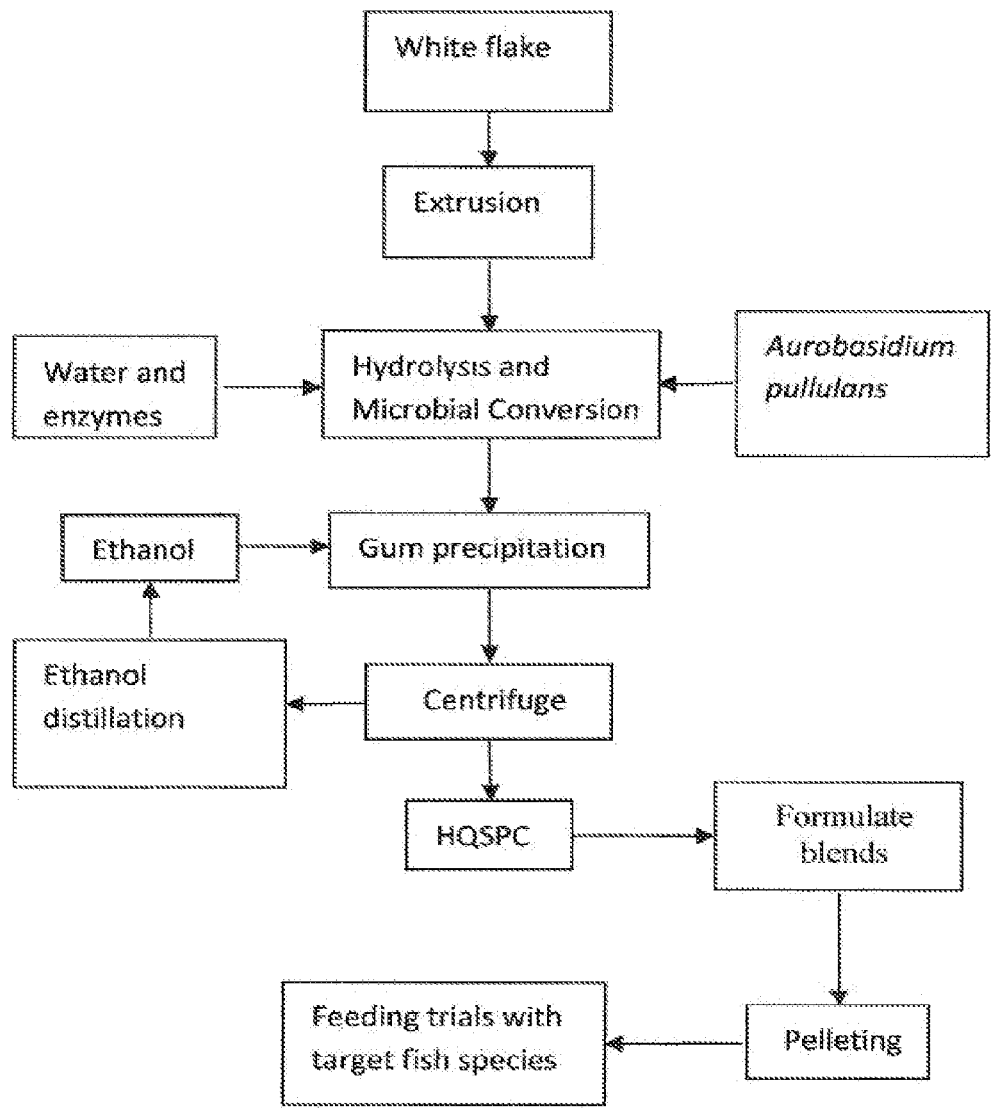
FIG. 2 shows a flow chart for the HQSPC conversion process for aqua feeds.

FIGS. 1 and 2 show the approach of the present disclosure in the pretreatment of plant based product, converting sugars into cell mass (protein) and gum, recovering HQSPC and generating aqua feeds, and testing the resulting aqua feeds in fish feeding trials.

After extrusion pretreatment, cellulose-deconstructing enzymes may be evaluated to generate sugars, which microbes of the present disclosure may convert to protein and gum. In embodiments, sequential omission of these enzymes and evaluation of co-culturing with cellulolytic microbes may be used. Ethanol may be evaluated to precipitate the gum and improve centrifugal recovery of the HQPC. After drying, the HQPC may be incorporated into practical diet formulations. In embodiments, test grower diets may be formulated (with mineral and vitamin premixes) and comparisons to a fish-meal control and commercial SPC (SPC is distinctly different from soybean meal, as it contains traces of oligopolysaccharides and antigenic substances glycinin and b-conglycinin) diets in feeding trials with a commercially important fish, e.g., yellow perch or rainbow trout, may be performed. Performance (e.g., growth, feed conversion, protein efficiency), viscera characteristics, and intestinal histology may be examined to assess fish responses.

In other embodiments, optimizing the HQPC production process by determining optimum pretreatment and conversion conditions while minimizing process inputs, improving the performance and robustness of the microbe, testing the resultant grower feeds for a range of commercially important fishes, validating process costs and energy requirements, and completing initial steps for scale-up and commercialization may be carried out.

In the past few years, a handful of facilities have installed a dry mill capability that removes corn hulls and germ prior to the ethanol production process. This dry fractionation process yields a DDGS with up to 42% protein (hereafter referred to as dryfrac DDGS). In embodiments, conventional and dryfrac DDGS under conditions previously determined to rapidly generate a sufficient amount of high protein DDGS (HP-DDGS) for use in perch feeding trials may be compared. In embodiments, careful monitoring of the performance of this conversion (via chemical composition changes) is carried out and parameters with the greatest impact on HP-DDGS quality identified. In some embodiments, low oil DDGS may be used as a substrate for conversion, where such low oil DDGS has a higher protein level than conventional DDGS. In a related aspect, low oil DDGS increase growth rates of *A. pullulans* compared to conventional DDGS.

Several groups are evaluating partial replacement of fishmeal with plant derived proteins, such as soybean meal and DDGS. However, the lower protein content, inadequate amino acid balance, and presence of anti-nutritional factors have limited the replacement levels to 20-40%. Preliminary growth trials indicate that no current DDGS or SPC-based diets provide performance similar to fish-meal control diets. Several deficiencies have been identified among commercially produced DDGS and SPCs, principally in protein and amino acid composition, which impart variability in growth performance and fish composition. However, HP-DDGS and HQSPC diets as disclosed herein containing nutritional supplements (formulated to meet or exceed all requirements) have provided growth results that are similar to or exceed fish-meal controls. Thus, the processes as disclosed herein and products developed therefrom provide a higher quality HQSPC or HP-DDGS (relative to nutritional requirements) and support growth performance equivalent to or better than diets containing fish meal.

Fish that can be fed the fish feed composition of the present disclosure include, but are not limited to, Siberian sturgeon, Sterlet sturgeon, Starry sturgeon, White sturgeon, Arapaima, Japanese eel, American eel, Short-finned eel, Long-finned eel, European eel, *Chanos chanos*, Milkfish, Bluegill sunfish, Green sunfish, White crappie, Black crappie, Asp, *Catla*, Goldfish, Crucian carp, Mud carp, Mrigal carp, Grass carp, Common carp, Silver carp, Bighead carp, Orangefin labeo, Roho labeo, Hoven's carp, Wuchang bream, Black carp, Golden shiner, Nilem carp, White amur bream, Thai silver barb, Java, Roach, Tench, Pond loach, Bocachico, Dorada, Cachama, Cachama Blanca, Paco, Black bullhead, Channel catfish, Bagrid catfish, Blue catfish, Wels catfish, *Pangasius* (Swai, Tra, Basa) catfish, Striped catfish, Mudfish, Philippine catfish, Hong Kong catfish, North African catfish, Bighead catfish, Sampa, South American catfish, Atipa, Northern pike, Ayu sweetfish, Vendace, Whitefish, Pink salmon, Chum salmon, Coho salmon, Masu salmon, Rainbow trout, Sockeye salmon, Chinook salmon, Atlantic salmon, Sea trout, Arctic char, Brook trout, Lake trout, Atlantic cod, Pejerrey, Lai, Common snook, Barramundi/Asian sea bass, Nile perch, Murray cod, Golden perch, Striped bass, White bass, European seabass, Hong Kong grouper, Areolate grouper, Greasy grouper, Spotted coralgrouper, Silver perch, White perch, Jade perch, Largemouth bass, Smallmouth bass, European perch, Zander (Pike-perch), Yellow Perch, Sauger, Walleye, Bluefish, Greater amberjack, Japanese amberjack, Snubnose pompano, Florida pompano, Palometa pompano, Japanese jack mackerel, Cobia, Mangrove red snapper, Yellowtail snapper, Dark seabream, White seabream, Crimson seabream, Red seabream, Red porgy, Goldlined seabream, Gilthead seabream, Red drum, Green terror, Blackbelt cichlid, Jaguar guapote, Mexican mojarra, Pearlspot, Three spotted tilapia, Blue tilapia, Longfin tilapia, Mozambique tilapia, Nile tilapia, Tilapia, Wami tilapia, Blackchin tilapia, Redbreast tilapia, Redbelly tilapia, Golden grey mullet, Largescale mullet, Gold-spot mullet, Thinlip grey mullet, Leaping mullet, Tade mullet, Flathead grey mullet, White mullet, Lebranche mullet, Pacific fat sleeper, Marble goby, White-spotted spinefoot, Goldlined spinefoot, Marbled spinefoot, Southern bluefin tuna, Northern bluefin tuna, Climbing perch, Snakeskin gourami, Kissing gourami, Giant gourami, Snakehead, Indonesian snakehead, Spotted snakehead, Striped snakehead, Turbot, Bastard halibut (Japanese flounder), Summer Flounder, Southern flounder, Winter flounder, Atlantic Halibut, Greenback flounder, Common sole, and combinations thereof It will be appreciated by the skilled person that the fish feed composition of the present disclosure may be used as a convenient carrier for pharmaceutically active substances such as for example antimicrobial agents and immunologically active substances including vaccines against bacterial or viral infections, and any combination thereof.

The fish feed composition according to present disclosure may be provided as a liquid, pourable emulsion, or in the form of a paste, or in a dry form, for example as a granulate or pellet, a powder, or as flakes. When the fish feed composition is provided as an emulsion, a lipid-in-water emulsion, it is may be in a relatively concentrated form. Such a concentrated emulsion form may also be referred to as a pre-emulsion as it may be diluted in one or more steps in an aqueous medium to provide the final enrichment medium for the organisms.

In embodiments, cellulosic-containing starting material for the microbial-based process as disclosed is corn. Corn is about two-thirds starch, which is converted during a fermentation and distilling process into ethanol and carbon dioxide. The remaining nutrients or fermentation products may result in condensed distiller's solubles or distiller's grains such as DDGS, which can be used in feed products. In general, the process involves an initial preparation step of dry milling or grinding of the corn. The processed corn is then subject to hydrolysis and enzymes added to break down the principal starch component in a saccharification step. The following step of fermentation is allowed to proceed upon addition of a microorganism (e.g., yeast) provided in accordance with an embodiment of the disclosure to produce gaseous products such as carbon dioxide. The fermentation is conducted for the production of ethanol which can be distilled from the fermentation broth. The remainder of the fermentation medium can be then dried to produce fermentation products including DDGS. This step usually includes a solid/liquid separation process by centrifugation wherein a solid phase component can be collected. Other methods including filtration and spray dry techniques can be employed to effect such separation. The liquid phase components can be subjected further afterwards to an evaporation step that can concentrate soluble coproducts, such as sugars, glycerol and amino acids, into a material called syrup or condensed corn solubles (CCS). The CCS can then be recombined with the solid phase component to be dried as incubation products (DDGS). It shall be understood that the subject compositions and can be applied to new or already existing ethanol plants based on dry milling to provide an integrated ethanol production process that also generates fermentation products with increased value.

In embodiments, incubation products produced according to the present disclosure have a higher commercial value than the conventional fermentation products. For example, the incubation products may include enhanced dried solids with improved amino acid and micronutrient content. A "golden colored" product can be thus provided which generally indicates higher amino acid digestibility compared to darker colored HQSP. For example, a light-colored HQSP may be produced with an increased lysine concentration in accordance with embodiments herein compared to relatively darker colored products with generally less nutritional value. The color of the products may be an important factor or indicator in the assessing the quality and nutrient digestibility of the fermentation products or HQSP. Color is used as an indicator of exposure to excess heat during drying causing caramelization and Millard reactions of the free amino groups and sugars, reducing the quality of some amino acids.

The basic steps in a dry mill or grind ethanol manufacturing process may be described as follows: milling or grinding of corn or other grain product, saccharification, fermentation, and distillation. For example, selected whole corn kernels may be milled or ground with typically either hammer mills or roller mills. The particle size can influence cooking hydration and subsequent enzymatic conversion. The milled or ground corn can be then mixed with water to make a mash that is cooked and cooled. It may be useful to include enzymes during the initial steps of this conversion to decrease the viscosity of the gelatinized starch. The mixture may be then transferred to saccharification reactors, maintained at selected temperatures such as 140° F., where the starch is converted by addition of saccharifying enzymes to fermentable sugars such as glucose or maltose. The converted mash can be cooled to desired temperatures such as 84° F., and fed to fermentation reactors where fermentable sugars are converted to carbon dioxide by the use of selected strains of microbes provided in accordance with the disclosure that results in more nutritional fermentation products compared to more traditional ingredients such as *Saccharomyces* yeasts. The resulting product can be flashed to separate out carbon dioxide and the resulting liquid can be fed to a recovery system consisting of distillation columns and a stripping column. The ethanol stream can be directed to a molecular sieve where remaining water is removed using adsorption technology. Purified ethanol, denatured with a small amount of gasoline, can produce fuel grade ethanol. Another product can be produced by further purifying the initial distillate ethanol to remove impurities, resulting in about 99.95% ethanol for non-fuel uses.

The whole stillage can be withdrawn from the bottom of the distillation unit and centrifuged to produce distiller's wet grains (DWG) and thin stillage (liquids). The DWG can leave the centrifuge at 55-65% moisture, and can either be sold wet as a cattle feed or dried as enhanced fermentation products provided in accordance with the disclosure. These products include an enhanced end product that may be referred to herein as distiller's dried grains (DDG). Using an evaporator, the thin stillage (liquid) can be concentrated to form distiller's solubles, which can be added back to and combined with a distiller's grains process stream and dried. This combined product in accordance with embodiments of the disclosure may be marketed as an enhanced fermentation product having increased amino acid and micronutrient content. It shall be understood that various concepts of the disclosure may be applied to other fermentation processes known in the field other than those illustrated herein.

Another aspect of the present invention is directed towards complete fish meal compositions with an enhanced concentration of nutrients which includes microorganisms characterized by an enhanced concentration of nutrients such as, but not limited to, fats, fatty acids, lipids such as phospholipid, vitamins, essential amino acids, peptides, proteins, carbohydrates, sterols, enzymes, and trace minerals such as, iron, copper, zinc, manganese, cobalt, iodine, selenium, molybdenum, nickel, fluorine, vanadium, tin, silicon, and combinations thereof.

In a incubation process of the present disclosure, a carbon source may be hydrolyzed to its component sugars by microorganisms to produce alcohol and other gaseous products. Gaseous product includes carbon dioxide and alcohol includes ethanol. The incubation products obtained after the incubation process are typically of higher commercial value. In embodiments, the incubation products contain microorganisms that have enhanced nutrient content than those products deficient in the microorganisms. The microorganisms may be present in an incubation system, the incubation broth and/or incubation biomass. The incubation broth and/or biomass may be dried (e.g., spray-dried), to produce the incubation products with an enhanced content of the nutritional contents.

For example, the spent, dried solids recovered following the incubation process are enhanced in accordance with the disclosure. These incubation products are generally non-toxic, biodegradable, readily available, inexpensive, and rich in nutrients. The choice of microorganism and the incubation conditions are important to produce a low toxicity or non-toxic incubation product for use as a feed or nutritional supplement. While glucose is the major sugar produced from the hydrolysis of the starch from grains, it is not the only sugar produced in carbohydrates generally. Unlike the SPC or DDG produced from the traditional dry mill ethanol production process, which contains a large amount of non-starch carbohydrates (e.g., as much as 35% percent of cellulose and arabinoxylans-measured as neutral detergent fiber, by dry weight), the subject nutrient enriched incubation products produced by enzymatic hydrolysis of the non-starch carbohydrates are more palatable and digestible to the non-ruminant.

The nutrient enriched incubation product of this disclosure may have a nutrient content of from at least about 1% to about 95% by weight. The nutrient content is preferably in the range of at least about 10%-20%, 20%-30%, 30%-40%, 40%-50%, 50%-60%, 60%-70%, and 70%-80% by weight. The available nutrient content may depend upon the animal to which it is fed and the context of the remainder of the diet, and stage in the animal life cycle. For instance, beef cattle require less histidine than lactating cows. Selection of suitable nutrient content for feeding animals is well known to those skilled in the art.

The incubation products may be prepared as a spray-dried biomass product. Optionally, the biomass may be separated by known methods, such as centrifugation, filtration, separation, decanting, a combination of separation and decanting, ultrafiltration or microfiltration. The biomass incubation products may be further treated to facilitate rumen bypass. In embodiments, the biomass product may be separated from the incubation medium, spray-dried, and optionally treated to modulate rumen bypass, and added to feed as a nutritional source. In addition to producing nutritionally enriched incubation products in a incubation process containing microorganisms, the nutritionally enriched incubation products may also be produced in transgenic plant systems. Methods for producing transgenic plant systems are known in the art. Alternatively, where the microorganism host excretes the nutritional contents, the nutritionally-enriched broth may be separated from the biomass produced by the incubation and the clarified broth may be used as an animal feed ingredient, e.g., either in liquid form or in spray dried form.

The incubation products obtained after the incubation process using microorganisms may be used as an animal feed or as food supplement for humans. The incubation product includes at least one ingredient that has an enhanced nutritional content that is derived from a non-animal source (e.g., a bacteria, yeast, and/or plant). In particular, the incubation products are rich in at least one or more of fats, fatty acids, lipids such as phospholipid, vitamins, essential amino acids, peptides, proteins, carbohydrates, sterols, enzymes, and trace minerals such as, iron, copper, zinc, manganese, cobalt, iodine, selenium, molybdenum, nickel, fluorine, vanadium, tin and silicon. In embodiments, the peptides contain at least one essential amino acid. In other embodiments, the essential amino acids are encapsulated inside a subject modified microorganism used in an incubation reaction. In embodiments, the essential amino acids are contained in heterologous polypeptides expressed by the microorganism. Where desired, the heterologous polypeptides are expressed and stored in the inclusion bodies in a suitable microorganism (e.g., fungi).

In embodiments, the incubation products have a high nutritional content. As a result, a higher percentage of the incubation products may be used in a complete animal feed. In embodiments, the feed composition comprises at least about 15% of incubation product by weight. In a complete feed, or diet, this material will be fed with other materials. Depending upon the nutritional content of the other materials, and/or the nutritional requirements of the animal to which the feed is provided, the modified incubation products may range from 15% of the feed to 100% of the feed. In embodiments, the subject incubation products may provide lower percentage blending due to high nutrient content. In other embodiments, the subject incubation products may provide very high fraction feeding, e.g. over 75%. In suitable embodiments, the feed composition comprises at least about 20%, at least about 25%, at least about 30%, at least about 35%, at least about 40%, at least about 45%, at least about 50%, at least about 60%, at least about 70%, or at least about 75% of the subject incubation products. Commonly, the feed composition comprises at least about 20% of incubation product by weight. More commonly, the feed composition comprises at least about 15-25%, 25-20%, 20-25%, 30%-40%, 40%-50%, 50%-60%, or 60%-70% by weight of incubation product. Where desired, the subject incubation products may be used as a sole source of feed.

The complete fish meal compositions may have enhanced amino acid content with regard to one or more essential amino acids for a variety of purposes, e.g., for weight increase and overall improvement of the animal's health. The complete fish meal compositions may have an enhanced amino acid content because of the presence of free amino acids and/or the presence of proteins or peptides including an essential amino acid, in the incubation products. Essential amino acids may include arginine, cysteine, histidine, isoleucine, lysine, methionine, phenylalanine, threonine, taurine, tryptophan, and/or valine, which may be present in the complete animal feed as a free amino acid or as part of a protein or peptide that is rich in the selected amino acid. At least one essential amino acid-rich peptide or protein may have at least 1% essential amino acid residues per total amino acid residues in the peptide or protein, at least 5% essential amino acid residues per total amino acid residues in the peptide or protein, or at least 10% essential amino acid residues per total amino acid residues in the protein. By feeding a diet balanced in nutrients to animals, maximum use is made of the nutritional content, requiring less feed to achieve comparable rates of growth, milk production, or a reduction in the nutrients present in the excreta reducing bioburden of the wastes.

A complete fish meal composition with an enhanced content of an essential amino acid, may have an essential amino acid content (including free essential amino acid and essential amino acid present in a protein or peptide) of at least 2.0 wt % relative to the weight of the crude protein and total amino acid content, and more suitably at least 5.0 wt % relative to the weight of the crude protein and total amino acid content. The complete fish meal composition includes other nutrients derived from microorganisms including but not limited to, fats, fatty acids, lipids such as phospholipid, vitamins, carbohydrates, sterols, enzymes, and trace minerals.

The complete fish meal composition may include complete feed form composition, concentrate form composition, blender form composition, and base form composition. If the composition is in the form of a complete feed, the percent nutrient level, where the nutrients are obtained from the microorganism in an incubation product, which may be about 10 to about 25 percent, more suitably about 14 to about 24 percent; whereas, if the composition is in the form of a concentrate, the nutrient level may be about 30 to about 50 percent, more suitably about 32 to about 48 percent. If the composition is in the form of a blender, the nutrient level in the composition may be about 20 to about 30 percent, more suitably about 24 to about 26 percent; and if the composition is in the form of a base mix, the nutrient level in the composition may be about 55 to about 65 percent. Unless otherwise stated herein, percentages are stated on a weight percent basis. If the HQPC is high in a single nutrient, e.g., Lys, it will be used as a supplement at a low rate; if it is balanced in amino acids and Vitamins, e.g., vitamin A and E, it will be a more complete feed and will be fed at a higher rate and supplemented with a low protein, low nutrient feed stock, like corn stover.

The fish meal composition may include a peptide or a crude protein fraction present in an incubation product having an essential amino acid content of at least about 2%. In embodiments, a peptide or crude protein fraction may have an essential amino acid content of at least about 3%, at least about 5%, at least about 10%, at least about 15%, at least about 20%, at least about 30%, at least about 40%, and in embodiments, at least about 50%. In embodiments, the peptide may be 100% essential amino acids. Commonly, the fish meal composition may include a peptide or crude protein fraction present in an incubation product having an essential amino acid content of up to about 10%. More commonly, the fish meal composition may include a peptide or a crude protein fraction present in an incubation product having an essential amino acid content of about 2-10%, 3.0-8.0%, or 4.0-6.0%.

The fish meal composition may include a peptide or a crude protein fraction present in a incubation product having a lysine content of at least about 2%. In embodiments, the peptide or crude protein fraction may have a lysine content of at least about 3%, at least about 5%, at least about 10%, at least about 15%, at least about 20%, at least about 30%, at least about 40%, and in embodiments, at least about 50%. Typically, the fish meal composition may include the peptide or crude protein fraction having a lysine content of up to about 10%. Where desired, the fish meal composition may include the peptide or a crude protein fraction having a lysine content of about 2-10%, 3.0-8.0%, or 4.0-6.0%.

The fish meal composition may include nutrients in the incubation product from about 1 g/Kg dry solids to 900 g/Kg dry solids. In embodiments, the nutrients in a fish meal composition may be present to at least about 2 g/Kg dry solids, 5 g/Kg dry solids, 10 g/Kg dry solids, 50 g/Kg dry solids, 100 g/Kg dry solids, 200 g/Kg dry solids, and about 300 g/Kg dry solids. In embodiments, the nutrients may be present to at least about 400 g/Kg dry solids, at least about 500 g/Kg dry solids, at least about 600 g/Kg dry solids, at least about 700 g/Kg dry solids, at least about 800 g/Kg dry solids and/or at least about 900 g/Kg dry solids.

The fish meal composition may include an essential amino acid or a peptide containing at least one essential amino acid present in an incubation product having a content of about 1 g/Kg dry solids to 900 g/Kg dry solids. In embodiments, the essential amino acid or a peptide containing at least one essential amino acid in a fish meal composition may be present to at least about 2 g/Kg dry solids, 5 g/Kg dry solids, 10 g/Kg dry solids, 50 g/Kg dry solids, 100 g/Kg dry solids, 200 g/Kg dry solids, and about 300 g/Kg dry solids. In embodiments, the essential amino acid or a peptide containing at least one essential amino acid may be present to at least about 400 g/Kg dry solids, at least about 500 g/Kg dry solids, at least about 600 g/Kg dry solids, at least about 700 g/Kg dry solids, at least about 800 g/Kg dry solids and/or at least about 900 g/Kg dry solids.

The complete fish meal composition may contain a nutrient enriched incubation product in the form of a biomass formed during incubation and at least one additional nutrient component. In another example, the fish meal composition contains a nutrient enriched incubation product that is dissolved and suspended from an incubation broth formed during incubation and at least one additional nutrient component. In a further embodiment, the fish meal composition has a crude protein fraction that includes at least one essential amino acid-rich protein. The fish meal composition may be formulated to deliver an improved balance of essential amino acids.

For compositions comprising DDGS, the complete composition form may contain one or more ingredients such as wheat middlings ("wheat mids"), corn, soybean meal, corn gluten meal, distiller's grains or distiller's grains with solubles, salt, macro-minerals, trace minerals and vitamins. Other potential ingredients may commonly include, but not be limited to sunflower meal, malt sprouts and soybean hulls. The blender form composition may contain wheat middlings, corn gluten meal, distiller's grains or distiller's grains with solubles, salt, macro-minerals, trace minerals and vitamins. Alternative ingredients would commonly include, but not be limited to, corn, soybean meal, sunflower meal, cottonseed meal, malt sprouts and soybean hulls. The base form composition may contain wheat middlings, corn gluten meal, and distiller's grains or distiller's grains with solubles. Alternative ingredients would commonly include, but are not limited to, soybean meal, sunflower meal, malt sprouts, macro-minerals, trace minerals and vitamins.

Highly unsaturated fatty acids (HUFAs) in microorganisms, when exposed to oxidizing conditions may be converted to less desirable unsaturated fatty acids or to saturated fatty acids. However, saturation of omega-3 HUFAs may be reduced or prevented by the introduction of synthetic antioxidants or naturally-occurring antioxidants, such as beta-carotene, vitamin E and vitamin C, into the feed. Synthetic antioxidants, such as BHT, BHA, TBHQ or ethoxyquin, or natural antioxidants such as tocopherols, may be incorporated into the food or feed products by adding them to the products, or they may be incorporated by in situ production in a suitable organism. The amount of antioxidants incorporated in this manner depends, for example, on subsequent use requirements, such as product formulation, packaging methods, and desired shelf life.

Incubation products or complete fish meal containing the incubation products of the present disclosure, may also be utilized as a nutritional supplement for human consumption if the process begins with human grade input materials, and human food quality standards are observed through out the process. Incubation product or the complete feed as disclosed herein is high in nutritional content. Nutrients such as, protein and fiber are associated with healthy diets. Recipes may be developed to utilize incubation product or the complete feed of the disclosure in foods such as cereal, crackers, pies, cookies, cakes, pizza crust, summer sausage, meat balls, shakes, and in any forms of edible food. Another choice may be to develop the incubation product or the complete feed of the disclosure into snacks or a snack bar, similar to a granola bar that could be easily eaten, convenient to distribute. A snack bar may include protein, fiber, germ, vitamins, minerals, from the grain, as well as nutraceuticals such as glucosamine, HUFAs, or co-factors, such as Vitamin Q-10.

The fish meal comprising the subject incubation products may be further supplemented with flavors. The choice of a particular flavor will depend on the animal to which the feed is provided. The flavors and aromas, both natural and artificial, may be used in making feeds more acceptable and palatable. These supplementations may blend well with all ingredients and may be available as a liquid or dry product form. Suitable flavors, attractants, and aromas to be supplemented in the animal feeds include but not limited to fish pheromones, fenugreek, banana, cherry, rosemary, cumin, carrot, peppermint oregano, vanilla, anise, plus rum, maple, caramel, citrus oils, ethyl butyrate, menthol, apple, cinnamon, any natural or artificial combinations thereof. The favors and aromas may be interchanged between different animals. Similarly, a variety of fruit flavors, artificial or natural may be added to food supplements comprising the subject incubation products for human consumption.

The shelf-life of the incubation product or the complete feed of the present disclosure may typically be longer than the shelf life of an incubation product that is deficient in the microorganism. The shelf-life may depend on factors such as, the moisture content of the product, how much air can flow through the feed mass, the environmental conditions and the use of preservatives. A preservative may be added to the complete feed to increase the shelf life to weeks and months. Other methods to increase shelf life include management similar to silage management such as mixing with other feeds and packing, covering with plastic or bagging. Cool conditions, preservatives and excluding air from the feed mass all extend shelf life of wet co-products. The complete feed can be stored in bunkers or silo bags. Drying the wet incubation product or complete feed may also increase the product's shelf life and improve consistency and quality.

The complete feed of the present disclosure may be stored for long periods of time. The shelf life may be extended by ensiling, adding preservatives such as organic acids, or blending with other feeds such as soy hulls. Commodity bins or bulk storage sheds may be used for storing the complete feeds.

As used herein, "room temperature" is about 25° C. under standard pressure.

The following examples are illustrative and are not intended to limit the scope of the disclosed subject matter.

EXAMPLES

Example 1. High Quality Soy Protein Concentrate (HQSPC)

FIG. 1 shows the overall approach to pre-treating white flakes, converting sugars into cell mass (protein) and gum, recovering HQSPC and generating aquafeeds (FIG. 2), and testing resulting aquafeeds in fish feeding trials. White flakes were first subject to extrusion pretreatment (BRABENDER PLASTI-CORDER SINGLE SCREW EXTRUDER Model PL2000, Hackensack, NJ) at 15% moisture content, 50° C., and 75 rpm to disrupt the structure and allow increased intrusion of hydrolytic enzymes during subsequent saccharification. These conditions provided a shearing effect against the rigged channels on both sides of the barrel, and it had been observed previously that this resulted in 50-70% greater sugar release following enzymatic hydrolysis. Extruded white flakes were then ground through a 3 mm hammermill screen, blended with water to achieve a 10% solid loading rate, and adjusted to pH 5. After heating to pasteurize or sterilize the mash, the mash was cooled to about 50° C. and cellulose and oligosaccharide-deconstructing enzymes (15 ml total/kg of white flake) were added to hydrolyze the polymers into simple sugars (4-24 h hydrolysis). Specific dosages included were 6% CELLIC CTEK (per gm glucan), 0.3% CELLIC HTEK (per gm total solids), 0.015% NOVOZYME 960 (per gm solids). The resulting mash was then cooled to 30° C., pH adjusted to 3-5, inoculated with *A. pullulans* (1% v/v), and incubated for 4-5 days at 50 to 200 rpm mixing and an aeration rate of 0.5 L/L/min to convert sugars into protein and gum. During incubation, samples were periodically removed and analyzed for sugars, cell counts and gum production. Following incubation, the pH was increased to 6.5, and ethanol (0.6 L/L broth) was added to precipitate the gum. The protein, pullulan and microbial mass (HQSPC) were recovered by centrifugation and dried, while the supernatant was distilled to recover ethanol, and the residual liquid chemically assayed for future recycling at the start of the process. The HQSPC was then tested in feeding trials with yellow perch, a fish of regional market importance. Test grower diets were formulated with HQ SPC compared to fishmeal and a competing plant based ingredient. Performance (e.g., growth, feed conversion, protein efficiency), viscera characteristics, and intestinal histology were examined to assess fish responses.

HQSPC using Soy White Flake and Microbial Conversion with *A. Pullulans*, pilot scale system for the production of HQSPC.

The system contained a 675 L bioreactor, a variable speed progressive cavity pump, a continuous flow centrifuge, and a 1×4 meter drying table. Inoculum for use in the 675 L bioreactor was prepared in two, 5 L NEW BRUNSWICK BIOFLO 3 BIOREACTORS. For each trial 8-10 L quantities of inoculum was prepared by growing *A. pullulan* as described for 2-3 days. This material was used to inoculate larger quantities of extruded and saccharified white flake prepared in the 675 L bioreactor. Following incubation, ethanol was added, the mash was centrifuged to recover the wet solids which were then dried and used in fish feeding trials. By monitoring performance of the conversion process, the yield and composition of the HQSPC, several parameters were observed that significantly affected solids recovery. In the large scale trials, the parameters as shown in Table 1 were varied.

TABLE 1

Pre-Pilot scale trail variables and key performance parameters.

| Parameter | Trial 1 | Trial 2 | Trial 3 | Trial 4 | Trial 5 | Trial 6 |
|---|---|---|---|---|---|---|
| Extruded | yes | yes | no | no | no | yes |
| Sacc Time (h) | 3 | 3.5 | 4 | 7 | 5 | 5 |
| Incub pH | 4.2 | 5.1 | 4.3 | 4.6 | 3.05 | 3.15 |
| Incub Temp (C.) | 29-30 | 29-30 | 29-30 | 26-27 | 29-30 | 29-30 |
| Aeration (L/L/min) | 0.25 | 0.25 | 0.25 | 0.5 | 0.5 | 0.5 |
| Incub Time (days) | 16 | 15 | 3.5 | 4.5 | 2 | 2.5 |
| Solids Recovery (%) | 20 | 16 | 48 | 48 | 60 | 64 |
| Solids % Protein | 75.18 | 75.04 | 63.93 | 61.5 | 61.61 | 56.86 |
| Trypsin Inhibitors | 0 | 0 | NA | NA | 16,750 | 6,538 |
| Supernatant % Solids | 2.5 | 5 | 2.1 | 3.89 | 2.39 | 3.4 |
| Supernatant % Protein | 78.16 | 80 | 71.66 | 61.47 | NA | NA |

From the HQSPC yields and protein levels, the following were noted: 1) an incubation pH of 3-3.5 and temperature of 30-32° C., along with high aeration maximized growth of *A.*

*pullulans* and minimized pullulan production, 2) an incubation time of 4-5 days was optimal for protein content and solids recovery, 3) longer incubation times increased protein content, but substantially reduced solids recovery, 4) shorter incubation times maintained high solids recovery, but limited protein content, and 5) due to the lack of stachyose and raffinose in the end product, extrusion and/or reduced (omitted) enzymatic saccharification may be possible.

Preliminary bench-scale trials in the 5 L bioreactors were conducted to optimize process conditions. A 10% solid loading rate of extruded white flake was used and saccharified for 24 h, followed by inoculation with *A. pullulans* and incubated at pH 5, 0.5 L/L/min aeration, 200 rpm agitation for 10 days. The extended incubation time was tested to establish optimal harvest window to maximize both percent solids recovery and protein content in the solids. Samples (100 ml) were removed daily and, on alternate days, were subjected to the following:

Precipitating all solids with ethanol, centrifuging and drying solids, measuring residual solids in the resulting supernatant.

Centrifuging the broth first to recover solids, drying the solids, precipitating the pullulan from the resulting supernatant and drying.

The ethanol precipitation first method recovered about 97% of the solids (soybean solids, cells and gum) using a lab centrifuge (10,000 g), with about 3% solids remaining in the fluid phase. The centrifugation first method recovered about 81.7% of solids (soybean solids and cells), with ethanol precipitation of the supernatant recovering about 14.8% solids (exopolysaccharide), and about 3.5% solids remaining in the fluid.

Figure 3:
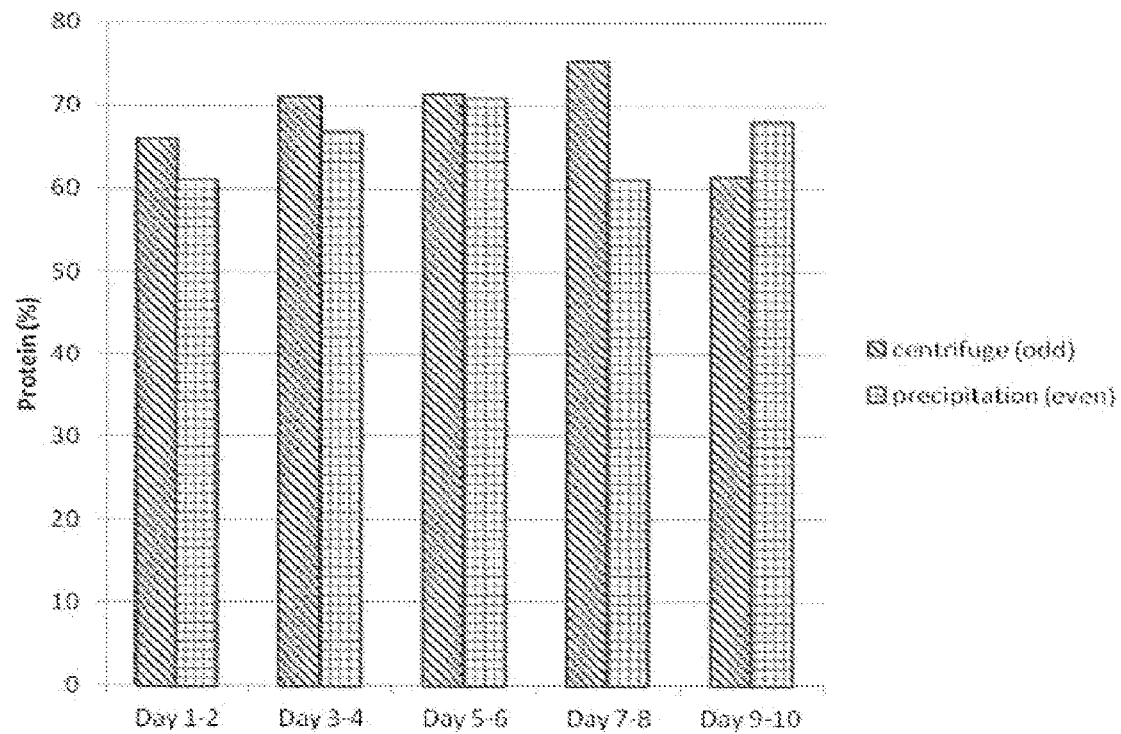
FIG. 3 shows bench scale, extended incubation trials to evaluate HQSPC composition and yield.

Through these bench scale trials, levels of protein, pullulan, and total solids that could be recovered each day were measured. It was expected that as incubation proceeded, protein and pullulan levels would increase, but that total solids recovered would decrease as some nutrients were catabolized into water and $CO_2$. Average protein levels of the solids from three replications are shown in FIG. 3. Protein levels reached 70% by day 3-5, while total solids recovered begin dropping by day 5-6. Thus it appears that a 4-5 day incubation time may be optimal.

Performance Evaluation of HQSPC as Fish Meal Replacement in Perch Fish

Several difference among commercially available SPC were previously identified, principally in protein and amino acid composition and anti-nutritional properties, which imparted variability in growth performance and fish composition. Those experiments justified the need to develop higher quality SPC products that would support growth performance equivalent to or better than diets containing fish meal. A feeding trial was conducted utilizing yellow perch to provide assessment of two HQSPC soy products (fermentation trials 5 and 6) in comparison to a commercial SPC and a Menhaden fish meal control.

Feed Preparations: Seven diets were formulated as follows:

Diet 1=fish meal control
Diet 2=commercial SPC
Diet 3=commercial SPC (supplemented with lysine+methionine)
Diet 4=HQSPC trial 5
Diet 5=HQSPC trial 5 (supplemented with lysine+methionine)
Diet 6=HQSPC trial 6
Diet 7=HQSPC trial 6 (supplemented with lysine+methionine)

Approximately 12 kg of each diet were prepared, including 2 kg containing 1 g/100 g chromic oxide for digestability determinations. The trial diets were formulated to contain equivalent SPC amounts with an appropriate protein:lipid target of 42:10. Soy Protein Concentrate (SPC, e.g., from Netzcon Ltd. Rehovot, Israel) with a minimum protein content of 69% is made by aqueous alcohol extraction of defatted non-toasted white flakes. SPC is distinctly different from soybean meal, as it contains traces of oligopolysaccharides and antigenic substances glycinin and b-conglycinin.

Large particle ingredients were ground with a Fitzpatrick comminutator (Elhurst, IL) with 0.51 mm screen prior to dry blending. Dry ingredients were blended for 20 min using a VI-10 mixer with an intensifier bar (Vanguard Pharmaceutical Machinery, Inc., Spring, TX). Dry blended feedstuffs were then transferred to a Hobart HL200 mixer (Troy, OH) where oils and water were added and blended for about 5 min. Feeds were then screw pressed using a Hobart 4146 grinder with a 3/16" die and dried under cool, forced-air conditions. Following drying, feeds were milled into pellets using a food processor, sieved to achieve consistent pellet size, and placed in frozen storage at −20° C. Chemical analyses of primary protein sources may be seen in Table 2.

TABLE 2

Composition of the primary protein sources (g/100 g, dry matter basis (dmb)) incorporated into yellow perch experimental diets.

| Protein Source | Menhaden Fish Meal | Commercial SPC | HQSPC Trial 5 | HQSPC Trial 6 |
|---|---|---|---|---|
| *Proximate Components* | | | | |
| Protein | 66.77 | 78.18 | 61.61 | 56.86 |
| Moisture* | 7.62 | 9.73 | 5.14 | 7.89 |
| Lipid | 5.21 | 0.00 | 1.70 | 1.26 |
| Crude Fiber | 0.18 | 10.08 | 0.81 | 4.86 |
| Ash | 25.33 | 7.10 | 8.82 | 5.21 |
| *Amino Acids* | | | | |
| Alanine | 3.97 | 3.03 | 2.71 | 2.66 |
| Arginine | 3.69 | 5.30 | 2.44 | 3.65 |
| Aspartic Acid | 5.47 | 8.08 | 6.72 | 6.45 |
| Cystine | 0.48 | 0.97 | 0.87 | 0.88 |
| Glutamic Acid | 7.73 | 12.51 | 8.70 | 8.85 |
| Glycine | 4.81 | 2.96 | 2.67 | 2.51 |
| Histidine | 1.26 | 1.84 | 1.41 | 1.40 |
| Hydroxylysine | 0.27 | 0.04 | 0.81 | 0.10 |
| Hydroxyproline | 1.19 | 0.08 | 0.10 | 0.07 |
| Isoleucine | 2.73 | 3.30 | 2.89 | 2.92 |
| Lanthionine | 0.00 | 0.02 | 0.00 | 0.00 |
| Leucine | 4.47 | 5.61 | 4.64 | 4.87 |
| Lysine | 4.58 | 4.56 | 3.47 | 3.41 |
| Methionine | 1.72 | 1.00 | 0.83 | 0.90 |
| Ornithine | 0.14 | 0.04 | 0.14 | 0.04 |
| Phenylalanine | 2.51 | 3.62 | 2.89 | 3.08 |
| Proline | 3.31 | 3.65 | 3.17 | 2.92 |
| Serine | 1.85 | 3.07 | 2.28 | 2.73 |
| Taurine | 0.42 | 0.08 | 0.09 | 0.10 |
| Threonine | 2.32 | 2.80 | 2.36 | 2.31 |
| Tryptophan | 0.58 | 1.00 | 0.79 | 0.82 |
| Tyrosine | 2.01 | 2.57 | 1.98 | 2.25 |
| Valine | 3.10 | 2.51 | 3.13 | 3.10 |
| *Oligosaccharides* | | | | |
| Raffinose | — | 0.00 | 0.00 | 0.00 |
| Stachyose | — | 0.24 | 0.00 | 0.00 |
| Phytic Acid | — | 0.23 | 0.39 | 0.18 |

*All ingredients are expressed on a dry matter basis with the exception of moisture (as is). Analyses were for crude protein (AOAC 2006, method 990.03), crude fat (AOAC 2006, method 9903), crude fiber (AOAC 2006, method 978.10), moisture (AOAC 2006, method 934.01) Chromic oxide (AOAC 2006, method 990.08), ash (AOAC 2006, method 942.05), and amino acids (AOAC 2006, method 982.30 E(a,b,c)).

Pellet Properties

Samples of each diet were analyzed in triplicate for moisture (%), water activity ($a_w$), unit density (kg/m3), pellet durability index (%), water stability (min), and color (L, a, b); compressive strength (g), and diameter (mm) were determined with n=10 replications. Moisture (%) was obtained using standard method 2.2.2.5 (NFTA, 2001). Water activity ($a_w$) of 2 g pellet samples was measured with a Lab Touch $a_w$ analyzer (Nocasina, Lachen S Z, Switzerland). Three color variables were analyzed with a spectrophotocolorimeter (Lab Scan XE, HunterLab, Reston, VA) as Hunter L (brightness/darkness), Hunter a (redness greenness) and Hunter b (yellowness/blueness). Unit density (UD) was estimated by weighing 100 ml of pellets and dividing the mass (kg) by 0.0001 m³. Pellet durability index (PDI) was determined according to standard method 5269.4 (ASAE 2003). The PDI was calculated as: PDI (%)=($M_a$/$M_b$)×100, where $M_a$ was the mass (g) after tumbling and $M_b$ was the mass (g) before tumbling. Pellet stability (min) was determined by the static ($W_{static}$) method (Ferouz et al., Cereal Chem (2011) 88:179-188) to mimic pellet leaching in tanks until they were consumed. Stability was calculated as loss of weight from leaching/dry weight of initial sample. Pellet diameter was measured using a conventional caliper. Pellets were tested for compressive strength using a TA.XT Plus Texture Analyzer (Scarsdale, NY).

Feeding Trial

Yellow perch (2.95 g±0.05 SE) were randomly stocked at 21 fish/tank into 28 circular tanks (110 liters) connected in parallel to a closed-loop recirculating aquaculture system (RAS). The RAS water flow and quality was maintained with a centrifugation pump consisting of dual solids sup tanks, bioreactor, bead filter, UV filter, and heat pump. System water was municipal that is dechlorinated and stored in a 15,200 L tank. Four replications of each treatment were applied randomly in tanks. Water flow was maintained at ~1.5 L/min/tank. Temperature was maintained at 22° C.±1°. Temperature and dissolved oxygen were measured with a YSI Pro Plus (Yellow Springs Instrument Company, Yellow Springs, OH). Ammonia-nitrogen, nitrite-nitrogen, nitrate-nitrogen, alkalinity (as $CaCO_3$), and free chlorine were tested using a Hach DR 3900 Spectrophotometer (Hach Company, Loveland, CO).

Fish were fed to satiation by hand twice daily, and feeding rates were modified according to tank weights, observed growth rates, and feed consumption assessments. Consumption (%) was estimated from a known number of pellets fed and by counting uneaten pellets 30 min after feeding. Collections of uneaten feed with subsequent dry weights were also used to estimate consumption. Weekly tank consumption estimates were multiplied by weekly rations to obtain weekly consumption (g). Palatability of treatments was determined by the amount of feed consumed or rejected. Tank mass (+0.01 g) was measured every other week to adjust feed rates and calculate performance indices. Individual lengths (mm) and weights (+0.01 g) were also measured every other week on four randomly sampled fish from each treatment.

Feed conversion ratio (FCR) was calculated as:

$$FCR = \frac{\text{mass of feed consumed (dry, g)}}{\text{growth (wet, g)}}$$

Protein conversion ratio was calculated as:

$$PER = \frac{\text{growth (wet, g)}}{\text{mass of protein consumed (dry, g)}}$$

Fulton-type condition factor (K) was calculated as:

$$K = \frac{\text{weight (g)}}{[\text{length (mm)}]^3} \times 10,000$$

Specific growth rate (SGR) was calculated as:

$$SGR = \frac{[\ln(\text{final wt (g)}) - \ln(\text{start wt(g)})] \times 100}{n(\text{days})}$$

Statistical analyses of diets and feeding trial responses were carried out with analysis of variance (ANOVA, a priori α=0.05). Significant F tests were followed by a post hoc Tukey's test to separate treatment means.

Pellet and Feed Results

Feed formulations were based on HQSPC nutrient analyses from Trail 3 (Table 1), while all soy protein concentrates were included equally at 45% (100% fish meal replacement) in trial diets. Analyses of Trials 5 and 6 were completed after scheduled feeding trial start date (Table 2), generally resulting in similar but not isonitrogenous diets. Diets were formulated to contain 42% protein and 10% lipid, with energy-to-protein (E:P) ratios of 7.91 to 7.94 (kcal/g). Recent analyses showed that crude protein (dmb) was 44.9% (Diet 1), 43.2% (Diets 2 and 3), 36.8% (Diets 4 and 5), and 37.5% (Diets 6 and 7). Crude lipid was approximately 10% for all diets. Amino acid analysis of feeds did not reveal any potential deficiencies among un-supplemented diets compared to yellow perch requirements (Table 3).

TABLE 3

Experimental design, dietary formulations, and compositions for the perch feeding trials.

| Ingredients (g/100 g, dmb) | Diet # 1 | 2 | 3 | 4 | 5 | 6 | 7 |
|---|---|---|---|---|---|---|---|
| Menhaden Fish Meal[a] | 50.0 | 0.0 | 0.0 | 0.0 | 0.0 | 0.0 | 0.0 |
| Commercial SPC | 0.0 | 45.0 | 45.0 | 0.0 | 0.0 | 0.0 | 0.0 |
| HQSPC Trial 5 | 0.0 | 0.0 | 0.0 | 45.0 | 45.0 | 0.0 | 0.0 |
| HQSPC Trial 6 | 0.0 | 0.0 | 0.0 | 0.0 | 0.0 | 45.0 | 45.0 |
| Yellow Corn Gluten[b] | 5.0 | 5.0 | 5.0 | 5.0 | 5.0 | 5.0 | 5.0 |
| Wheat Flour[c] | 18.0 | 21.0 | 21.0 | 21.0 | 21.0 | 21.0 | 21.0 |
| Wheat Gluten[b] | 6.0 | 5.0 | 5.0 | 5.0 | 5.0 | 5.0 | 5.0 |
| CMC[d] | 5.0 | 5.0 | 5.0 | 5.0 | 5.0 | 5.0 | 5.0 |
| Celufil[d] | 3.7 | 3.6 | 3.6 | 3.5 | 3.0 | 3.5 | 3.0 |

TABLE 3-continued

Experimental design, dietary formulations, and compositions for the perch feeding trials.

| Ingredients (g/100 g, dmb) | 1 | 2 | 3 | 4 | 5 | 6 | 7 |
|---|---|---|---|---|---|---|---|
| Menhaden Oil[e] | 4.59 | 8.19 | 8.19 | 8.37 | 8.37 | 8.37 | 8.37 |
| Flax Oil[f] | 0.51 | 0.91 | 0.91 | 0.93 | 0.93 | 0.93 | 0.93 |
| Vitamin Premix[g] | 0.5 | 0.5 | 0.5 | 0.5 | 0.5 | 0.5 | 0.5 |
| Mineral Premix[h] | 0.1 | 0.1 | 0.1 | 0.1 | 0.1 | 0.1 | 0.1 |
| Vitamin C[i] | 0.05 | 0.05 | 0.05 | 0.05 | 0.05 | 0.05 | 0.05 |
| Choline[j] | 0.2 | 0.2 | 0.2 | 0.2 | 0.2 | 0.2 | 0.2 |
| Phytase[k] | 0.037 | 0.037 | 0.037 | 0.037 | 0.037 | 0.037 | 0.037 |
| Brewer's Yeast[l] | 2.0 | 2.0 | 2.0 | 2.0 | 2.0 | 2.0 | 2.0 |
| L-Lysine[j] | 0.0 | 0.0 | 0.3 | 0.0 | 0.3 | 0.0 | 0.3 |
| L-Betaine[j] | 0.5 | 0.5 | 0.5 | 0.5 | 0.5 | 0.5 | 0.5 |
| L-Methionine[j] | 0.0 | 0.0 | 0.2 | 0.0 | 0.2 | 0.0 | 0.2 |
| Sodium Chloride[m] | 1.0 | 1.0 | 1.0 | 1.0 | 1.0 | 1.0 | 1.0 |
| Potassium Chloride[m] | 0.8 | 0.8 | 0.8 | 0.8 | 0.8 | 0.8 | 0.8 |
| Magnesium Oxide[m] | 0.05 | 0.05 | 0.05 | 0.05 | 0.05 | 0.05 | 0.05 |
| Calcium Phosphate[m] | 2.0 | 1.0 | 1.0 | 1.0 | 1.0 | 1.0 | 1.0 |
| Estimated Proximate Composition | | | | | | | |
| Protein (%) | 42.1 | 42.2 | 42.7 | 42.0 | 42.5 | 42.0 | 42.5 |
| Lipid (%) | 10.06 | 10.01 | 10.01 | 10.03 | 10.03 | 10.03 | 10.03 |
| Ash (%) | 4.46 | 3.46 | 3.46 | 3.46 | 3.46 | 3.46 | 3.46 |
| Total Energy (kcal) | 334.3 | 334.3 | 337.1 | 333.5 | 336.3 | 333.5 | 336.3 |
| E:P (kcal/g) | 7.94 | 7.93 | 7.94 | 7.91 | 7.94 | 7.94 | 7.91 |

[a] Special Select, Omega Protein, Houston, TX;
[b] Consumers Supply Distribution, Sioux City, IA;
[c] Bob's Red Mill Natural Foods, Milwaukie, OR;
[d] USB Corporation, Cleveland, OH;
[e] Virginia Prime Gold, Omega Protein, HoustonTX;
[f] Thomas Laboratories, Tolleson, AZ; & ARS 702 Premix, Nelson and Sons, Murray, UT;
[h] SS #3 Trace Mix, Nelson and Sons, Murray, UT;
[i] U.S. Nutrition, Bohemia, NY;
[j] Pure Bulk, Roseburg, OR;
[k] DSM Nutritional Products, Parsippany, NJ;
[l] Diamond V Mills, Cedar Rapids, IA;
[m] Fisher Scientific, Pittsburg, PA.

Pellet feeds exhibited significant differences in measurements among treatments except for diameters (Table 4).

TABLE 4

Physical properties of the feed extrudates.

| Properties | 1 | 2 | 3 | 4 | 5 | 6 | 7 |
|---|---|---|---|---|---|---|---|
| MC (% db) | 8.5 ± 0.2 [a] | 11.0 ± 0.3 [b] | 11.0 ± 0.1 [b] | 14.1 ± 0.1 [c] | 9.9 ± 0.1 [d] | 10.1 ± 0.1 [d] | 12.2 ± 0.1 [e] |
| $a_w$ (-) | 0.58 ± 0.02 [a] | 0.67 ± 0.00 [b] | 0.69 ± 0.00 [c] | 0.68 ± 0.00 [bc] | 0.68 ± 0.00 [bc] | 0.68 ± 0.00 [bc] | 0.74 ± 0.01 [d] |
| BD (kg/m$^3$) | 634.8 ± 3.0 [a] | 648.6 ± 3.2 [b] | 659.4 ± 2.4 [bc] | 675.4 ± 0.5 [d] | 688.9 ± 0.6 [e] | 669.3 ± 2.8 [cd] | 695.9 ± 2.2 [e] |
| CS (g) | 24.4 ± 0.7 [a] | 56.1 ± 1.8 [b] | 42.9 ± 2.3 [c] | 44.9 ± 3.8 [bc] | 54.8 ± 2.3 [b] | 67.0 ± 2.2 [b] | 60.1 ± 3.9 [b] |
| PDI (%) | 98.1 ± 0.4 [a] | 98.1 ± 0.8 [a] | 98.1 ± 0.7 [a] | 98.3 ± 0.3 [a] | 99.3 ± 0.3 [b] | 99.5 ± 0.2 [b] | 99.5 ± 0.3 [b] |
| $WSI_{still}$ (%) | 10.2 ± 0.0 [ab] | 11.9 ± 0.0 [a] | 9.1 ± 0.0 [ab] | 8.9 ± 0.0 [ab] | 9.1 ± 0.0 [ab] | 8.2 ± 0.0 [ab] | 6.7 ± 0.0 [b] |
| L (-) | 47.9 ± 0.2 [a] | 58.5 ± 0.1 [b] | 68.5 ± 0.5 [c] | 59.9 ± 0.3 [bd] | 53.7 ± 0.2 [e] | 60.6 ± 0.3 [d] | 63.8 ± 0.4 [f] |
| a (-) | 5.2 ± 0.0 [a] | 2.8 ± 0.0 [b] | 3.2 ± 0.1 [c] | 4.3 ± 0.0 [d] | 4.4 ± 0.0 [d] | 2.9 ± 0.0 [b] | 2.9 ± 0.0 [b] |
| b (-) | 22.8 ± 0.1 [a] | 18.1 ± 0.1 [b] | 20.2 ± 0.1 [c] | 22.8 ± 0.1 [a] | 21.4 ± 0.1 [d] | 20.3 ± 0.0 [ce] | 20.7 ± 0.1 [e] |
| Dia. (mm) | 2.2 ± 0.0 [a] | 2.1 ± 0.1 [a] | 2.1 ± 0.0 [a] | 2.0 ± 0.0 [a] | 2.0 ± 0.0 [a] | 2.0 ± 0.0 [a] | 2.0 ± 0.0 [a] |

Values given are means (±SE) associated with treatment means. Values not significantly different ($P > 0.05$) have same letter within a given row.
MC (% db) = moisture content;
$a_w$ (-) = water activity;
BD (kg/m$^3$) = unit density;
CS (g) = compressive strength;
PDI (%) = pellet durability index;
$WSI_{still}$ (%) = water solubility index in still water;
L (-) = Hunter brightness;
a (-) = Hunter yellowness;
b (-) = Hunter redness;
Dia. (mm) = diameter.

Moisture content (MC) ranged from about 8.49% (Diet 1) to about 14.07% (Diet 4). MC contributes an effect on other characteristics, such as PDI, compressive strength, and color. No apparent correlation between MC and other variables were identified.

Fish Performance

Diet 6 provided the most comparable results to Diet 1 (fishmeal) in growth performance. Growth performance was significantly different between treatments in all categories (Table 5).

TABLE 5

Performance Aspects.

| Diet | WG | SGR | S | TC | FCR | PER | K |
|---|---|---|---|---|---|---|---|
| 1 | 102.1 ± 8.0$^a$ | 1.66 ± 0.1 $^a$ | 100.0 ± 0.0 $^a$ | 450.2 ± 5.8 $^a$ | 1.27 ± 0.05 $^a$ | 1.76 ± 0.06 $^a$ | 1.06 ± 0.01 $^{ab}$ |
| 2 | 12.6 ± 6.4 $^b$ | 0.55 ± 0.12 $^b$ | 82.3 ± 0.6 $^b$ | 140.9 ± 4.7 $^b$ | 2.59 ± 0.49 $^b$ | 0.98 ± 0.17 $^b$ | 1.01 ± 0.02 $^a$ |
| 3 | 23.7 ± 1.3 $^{bc}$ | 0.59 ± 0.04 $^{bc}$ | 96.4 ± 0.3 $^a$ | 181.6 ± 2.5 $^{bc}$ | 2.0 ± 0.09 $^{ab}$ | 1.17 ± 0.06 $^b$ | 1.02 ± 0.03 $^{ab}$ |
| 4 | 46.6 ± 8.3 $^{cd}$ | 1.06 ± 0.12 $^c$ | 94.1 ± 0.5 $^{abc}$ | 283.4 ± 8.9 $^{bc}$ | 1.6 ± 0.04 $^a$ | 1.7 ± 0.04 $^a$ | 1.11 ± 0.04 $^{ab}$ |
| 5 | 49.1 ± 11.0 $^{cd}$ | 1.10 ± 0.14 $^d$ | 92.9 ± 0.3 $^{abc}$ | 306.3 ± 11.2 $^{ac}$ | 1.73 ± 0.10 $^{ab}$ | 1.59 ± 0.10 $^a$ | 1.14 ± 0.03 $^b$ |
| 6 | 84.4 ± 2.4 $^{ae}$ | 1.48 ± 0.05 $^{ad}$ | 98.8 ± 0.3 $^{ac}$ | 451.5 ± 13.4 $^a$ | 1.43 ± 0.04 $^a$ | 1.87 ± 0.05 $^a$ | 1.07 ± 0.03 $^{ab}$ |
| 7 | 61.8 ± 4.8 $^{de}$ | 1.28 ± 0.12 $^{ad}$ | 94.1 ± 0.6 $^{abc}$ | 338.1 ± 10.8 $^{ac}$ | 1.58 ± 0.03 $^a$ | 1.69 ± 0.03 $^a$ | 1.06 ± 0.02 $^{ab}$ |

Mean weight gain (WG, %), specific growth rate (SGR), survival (S, %), total consumption (TC, g), food conversion ratio (FCR), protein efficiency ratio (PER), and Fulton-type condition factor (K) values for perch fed experimental diets. Values given are means (±SE) associated with the treatment means. Values not significantly different (P > 0.005) have the same letter within a given column.

Water activity, a measure of unbound water in pellets, was high (about 0.58 to about 0.74), with Diet 1 (fish meal) significantly lower (about 0.58) and Diet 7 significantly higher (about 0.74) than all other treatments. Values over 0.6 indicate low storage stability and may allow microbial growth to proliferate. Feeds were stored in a freezer at −20° C.

Unit density (BD), a measure of feed weight per unit volume, ranged from about 634.87 to about 695.9. Diet 1 (fish meal) had a lower DB, and while not being limited by theory, this is most likely due to lower inclusion of fish oil and fish meal. Soy protein concentrate diets had higher BDs because they contained more oil to amend lipid requirements.

Compressive strength (CS) was calculated as peak fracture force of the stress-strain curve from a perpendicular axial direction. CS varied significantly from about 24.36 to about 67.03. Diet 1 (fish meal) exhibited the lowest compressive strength (about 24.36). While not being limited by theory, this is most likely attributable to the heterogeneity of the pellets, which results from the pelleting process (e.g., screw pressed rather than extruded). Extrusion cooks the feed with a combination of moisture, pressure, temperature, and mechanical shear. This process gelatinizes starches, which can increase CS substantially.

Pellet Durability Index (PDI) was very high in all diets (about 98.05% to about 99.48%), with no significant difference between treatments. These high PDI values may be the result of high MC, as well as carboxymethylcellulose (CMC) binder addition.

Water Solubility Index (WSI) was low in all diets (about 9.65 to about 14.43), with Diet 4 exhibiting the highest value, which was significantly different than the lowest, Diet 7, at about 9.65. Due to the nature of screw-pressed compared to extruded feeds, WSI was expected to be low. Extruded feeds are more water stable due to gelatinization of starches, reducing water penetration.

Hunter color parameters (L, a, b) revealed similarities with growth performance. Hunter a (redness) was highest in diet 1 (5.15) and lowest in Diet 2 (2.80), Hunter b (yellowness) was highest in Diet 4 (22.81) and Diet 1 (22.76) and lowest in Diet 2 (18.07). Hunter L (brightness) was highest in Diet 3 (68.48) and lowest in Diet 1 (47.91). Lighter color feeds have been found to contain higher concentrations and greater availability of lysine compared to darker feeds.

Supplemented diets (Diets 3 and 5) were slightly better than their un-supplemented counterparts, except for Diets 6 and 7. Diet 6 outperformed Diet 7 in all aspects. While not being bound by theory, this could be the result of timing issues associated with the bioavailability of crystalline amino acid supplements.

Weight Gain (WG) was highest for Diet 1 (fishmeal at 102.1%), followed by Diets 6 and 7 (84.4% and 61.8%, respectively). Diets 2 and 3 (commercial SPC) exhibited the lowest WG (12.62% and 23.69%, respectively). Specific Growth Rate (SGR) paralleled WG results. SGR was highest in Diet 1 (1.66) and lowest in Diet 2 (0.55).

Protein Efficiency Ratio (PER) was highest in Diet 6 (1.87), followed by Diet 1 (1.76) and Diet 4 (1.70). Diets 2 and 3 had the lowest PERs of 0.98 and 1.17, respectively. PER was better in un-supplemented Diets 4 and 6 than in supplemented diets 5 and 7.

Feed conversion ratio (FCR) followed a similar pattern, with Diets 1 and Diet 6 being lowest (1.39 and 1.59, respectively). These FCR values indicate very high nutritional feed quality. Diets 2 and 3 had the highest FCR (2.91 and 2.24, respectively).

Total consumption (dmb) was highest with Diet 6 (451.5 g) and Diet 1 (450.20 g) and lowest with Diet 2 (140.91) and Diet 3 (181.60). All diets were fed to satiation. Diets consumption was deemed indicative of palatability, which is also the reason for significantly lower survival for fish on Diet 2 (82.29%). Survival was 100% for Diet 1 and 98.81% for Diet 6.

Fulton's Condition Factor (K) was highest for Diet 5 (1.14) and lowest for Diet 2 (1.01). All HQSPC diets met or exceeded the fishmeal control for this specific performance parameter. Commercial SPC diets were lower than all other diets.

Other Assays

End of trial analyses may include final growth, FCR, PER, consumption, and examination for nutrition deficiencies via necropsy. Plasma assays may be completed for lysine and methionine using standard methods. Individual fish may be euthanized by cervical dislocation in order to quantify muscle ratio, hepatosomatic index, viscerosomatic index, fillet composition, and hind gut histology (enteritis inflammation scores). Protein and energy availability of trial diets may be estimated using chromic oxide ($CrO_3$) marker within the feed and fecal material. Fecal material may be collected via necropsy from the lower intestinal tract.

The apparent digestibility coefficients (ADC) for the nutrients in the test diets may be calculated using the following formula:

$$ADC_{test\ ingredient} = ADC_{test\ diet} + \left[(ADC_{tet\ diet} - ADC_{ref\ diet}) \times \left(\frac{0.7 \times D_{ref}}{0.3 \times D_{ingr}}\right)\right]$$

where Dref=% with nutrient (kJ/g gross energy) of reference diet mash (as is) and Dingr=% nutrient (kJ/g gross energy) of test ingredient (as is).

Summary

Screw-pressed compound feeds for yellow perch were exemplified using two HQSPC diets, a fish control meal, and a commercial soy protein concentrate (SPC). The HQSPC-based diets had comparable performance to fish meal and outperformed the commercial SPC. Growth and conversion performance exceeded expectations, given crude protein content in the HQSPC diets was approximately 7% less than the fish meal control and 6% less than the commercial SPC. Thus, the HQSPC diets may serve as a complete replacement for fish meal.

Performance evaluation of HQSPC as Fish Meal Replacement in Rainbow Trout

In addition to the yellow perch results above, a 90-day feeding trial was conducted using a domesticated rainbow trout strain (Shasta). Table 6 summarizes the protein targets by fish species and size. These dietary protein targets or levels (%) may be used in the formulation of experimental diets for these commercially important finfish.

TABLE 6

Protein targets for various finfish by weight range.

| Species | <20 | 20-200 | 200-600 | 600-1,500 | >1,500 |
|---|---|---|---|---|---|
| Atlantic salmon | 48 | 44 | 40 | 38 | 34 |
| Pacific salmon | 55 | 45 | 40 | 38 | 38 |
| Rainbow trout | 48 | 40 | 38 | 38 | 36 |
| Channel catfish | 44 | 36 | 32 | 32 | 28 |
| Nile tilapia | 40 | 34 | 30 | 28 | 26 |

Weight ranges (g)

Trout were fed a control fish meal diet or a diet replacing 70% of fish meal (Diet 2—35% inclusion) with an HQSPC product (Trial 6) (see Table 7).

TABLE 7

Test Diet Formulations Used in a Rainbow Trout Feeding Trial

| Ingredient (g) | Diet 1 | Diet 2 |
|---|---|---|
| Omega prime special select | 40 | 15 |
| HQSPC | 0 | 35 |
| Yellow corn gluten | 20 | 16 |
| Wheat flour | 15 | 11 |
| Carboxymethylcellulose | 6.7 | 3 |
| Vitamin premix | 1.5 | 1.5 |
| Trace mineral premix | 1.5 | 1.5 |
| Stay-C | 0.5 | 0.5 |
| DVAqua | 0.1 | 0.1 |
| Methionine | 0 | 0.2 |
| Sodium chloride | 0.5 | 0.5 |
| Potassium chloride | 0.5 | 0.5 |
| Magnesium oxide | 0 | 0 |
| Calcium phosphate | 0 | 0.5 |
| Menhaden oil | 13.7 | 14.7 |

TABLE 7-continued

Test Diet Formulations Used in a Rainbow Trout Feeding Trial

| Ingredient (g) | Diet 1 | Diet 2 |
|---|---|---|
| Proximates | | |
| Protein | 42.87 | 42.89 |
| Fat | 16.37 | 16.38 |
| Fiber | 0.61 | 2.14 |
| Ash | 12.31 | 8.15 |
| Kcal | 398.54 | 398.68 |
| E:P | 9.30 | 9.29 |

The 35% inclusion level was used to exceed the 30% inclusion recommended for other soy protein concentrates, such as Selecta SPC60. This trial using isocaloric, isonitrogenous diets demonstrated equivalent performance between the control and test diet provided.

Table 8 summarizes the observed rainbow trout performance characteristics during the 90-day feeding trial. Diet 2, containing HQSPC, showed no decline in weight gain or feed conversion/efficiency and there were no mortalities (100% survival). These observations replicate the results observed in the yellow perch trials.

TABLE 8

Performance trails for rainbow trout using HQSPC.

| FM:HQSPC (%) | Diet 1 (40:0) | Diet 2 (15:35) |
|---|---|---|
| Start weight (g) | 795 ± 67 | 882 ± 44 |
| End weight (g) | 3,400 ± 216 | 3,706 ± 172 |
| Gain (g) | 2,605 ± 149 ab | 2,824 ± 133 a |
| Gain (%) | 327.7 | 320.2 |
| Food fed (g) | 3,608 ± 189 | 3,880 ± 68 |
| FCR | 1.39 ± 0.06 a | 1.38 ± 0.07 a |
| Mortality (%) | 0.0 + 0.0 | 0.0 + 0.0 |

Values given are means (±SE) associated with the treatment means.

Summary

Screw-pressed compound feeds for rainbow trout were exemplified using an HQSPC diet and a fish control meal. In this trial the HQSPC-based diets had comparable performance to fish meal. Again, these data show that the HQSPC diets exceeded the expected results using SPC (e.g., HQSPC may be used at concentration greater than a 30% inclusion level), and may serve as an efficacious replacement for fish meal.

Example 2. Production of HP-DDGS Using Microbial Conversion

Figure 4:
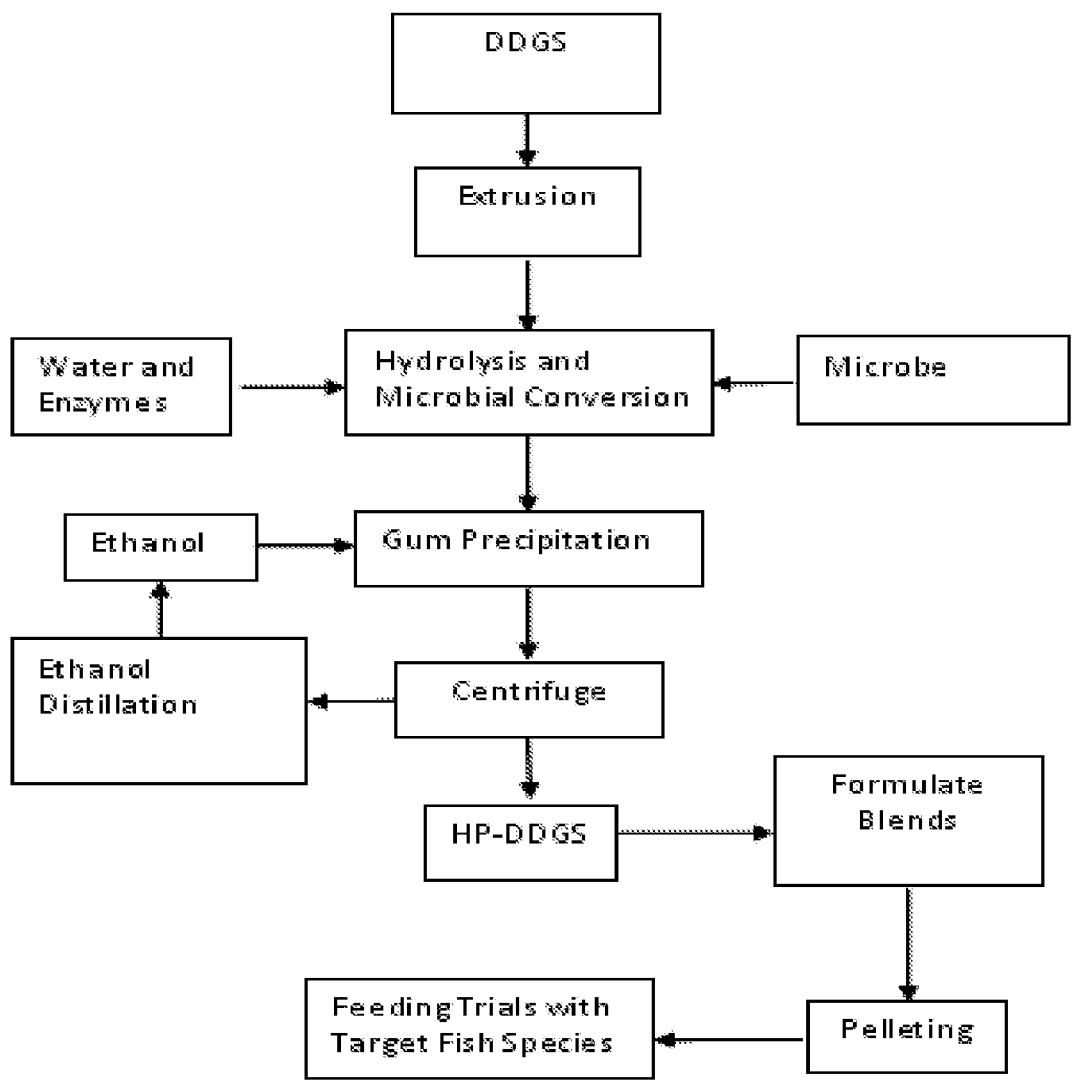
FIG. 4 shows a flow chart for the HP-DDGS conversion process for aqua feeds.
Figure 5:
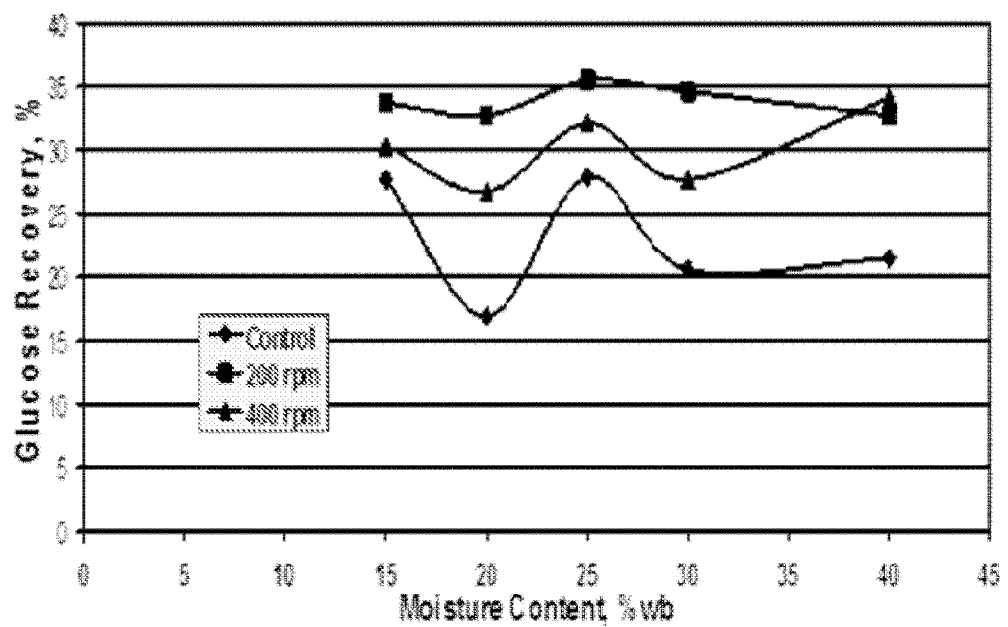
FIG. 5 shows the effect of moisture content and extrusion speed on glucose recovery following extrusion of HP-DDGS at 100° C.

The effects of extrusion on improving saccharification of DDGS using a single screw extruder (BRABENDER PLASTI-CORDER EXTRUDER Model PL2000, Hackensack, NJ) with barrel length to screw diameter of 1:20 and a compression ratio of 3:1 was investigated (FIGS. 4 and 5). It was determined that 25% DDGS moisture content, temperature of 100° C. to 160° C., and screw speed of 200 rpm resulted in a 36% sugar recovery from corn fiber (FIG. 5). The performance of various NOVOZYME lignocellulose deconstructing enzymes was separately evaluated and it was found that 6% CELLIC CTEK2 (per gm glucan) and 0.3% CELLIC HTEK2 (per gm total solids) resulted in sugar recoveries up to 70%. These pretreatment and saccharification conditions may be used to generate HP-DDGS. Next options such as co-culturing with cellulase-producers to reduce the need for added enzymes may be carried out, as well as using fed-batch bioreactors to reduce processing costs.

Evaluating growth and gum production of the microbe on the carbohydrates found in soybean meal was carried out and it was found that protein content can be increased from 42% to at least 60% by using the approach as disclosed herein. This showed that the microbe (e.g., *A. pullulans*) can efficiently convert a broad range of difficult to metabolize oligosaccharides into cell mass (i.e., protein) and a microbial gum. This effort with soybean meal was initiated based on prior studies that evaluated production of a range of microbial gums (exopolysaccharides) from corn processing byproducts such as whole stillage, thin stillage, and condensed corn solubles. Through this work, a variety of microbial strains have been accumulated that efficiently grow on various corn processing byproducts and produce high levels of cell mass and gums from the available sugars. Key operational parameters and lower-cost gum recovery methods have been identified and developed. Based on this body of work, and the knowledge that the strains of microbes produce a broad range of hydrolytic enzymes, robust processes have been identified that allow for effective conversion DDGS into HP-DDGS (e.g., *A. pullulans* strain NRRL No. 50793).

For pretreatment, the conventional, dryfrac, and/or low oil DDGS are extruded in a single screw extruder (BRABENDER PLASTI-CORDER EXTRUDER Model PL2000, Hackensack, NJ) with a barrel length to screw diameter of 1:20 and a compression ratio of 3:1. DDGS samples (adjusted to 25% moisture), the temperature of feed, barrel, and outlet sections of extruder is held at 100° C. to 160° C., and screw speed is set at 200 rpm, providing a shearing effect against the ridged channels on both sides of the barrel. These selected levels of temperature, screw speed and moisture were based on optimized conditions defined previously that resulted in 36% sugar release from corn fiber due to disruption of the DDGS matrix.

Extruded conventional and dryfrac DDGS is mixed with water to achieve a solid loading rate of at least 5% in a 5 L NEW BRUNSWICK BIOFLO 3 BIOREACTOR (3-4 L working volume) at a pH of 5.8. After autoclaving and cooling, the slurry is saccharified using a cocktail of NOVOZYME enzymes for which preliminary data has previously been collected. Dosages to be used in the initial trials includes 6% CELLIC CTEK2 (per gm glucan) and 0.3% CELLIC HTEK2 (per gm total solids). Saccharification is conducted for 24 h at 50° C. and 150 rpm to solubilize the fibers and oligosaccharides into simple sugars. The temperature is then reduced to 35° C., the pH is adjusted to 4.0 (to optimize cell growth), and the slurry is inoculated with 2% (v/v) of a 24 h culture of the microbe. The slurry is aerated at 0.5 L/L/min and incubation is continued until sugar utilization ceases (96-120 h anticipated). The following parameters are then evaluated:
1) replacing the cellulase enzymes with cellulase producing microbes that would be co-cultured with the microbe;
2) maximizing initial solid loading rate; and
3) adding more extruded substrate during either saccharification and/or the microbial conversion phases (i.e., fed-batch operation) to minimize net enzyme dosage, maximize protein and gum concentrations, and minimize product recovery costs.

During incubation, samples are removed at 6-12 h intervals. Samples for HPLC analysis are boiled (to inactivate enzymes), centrifuged, filtered through 0.22-μm filters, placed into autosampler vials, and frozen until analysis. These samples are assayed for carbohydrates and organic solvents using a WATERS HPLC system. Samples are subjected to microbial counts to assess microbial populations. Samples are also assayed for levels of cellulose and hemicellulose using National Renewable Energy Laboratory procedures.

The converted slurry is then subjected to ethanol precipitation and centrifugation to separate the protein, microbial gum and microbial biomass (HP-DDGS) from the remaining culture fluid. While not being bound by theory, the presence of a precipitating gum improves the efficiency of centrifugation in recovering suspended solids. The composition of the HP-DDGS is then determined and used in fish feeding trials. Ethanol is recovered from the liquid stream via distillation, and the residual liquid is chemically analyzed to assess potential uses (e.g., incorporation into the HP-DDGS or biogas production).

The HP-DDGS so produced contains a microbial gum to serve as a binding agent and potentially as an immunostimulant. Other hydrolytic enzymes excreted by the microbe should release peptides, amino acids, and any remaining lipids, thereby increasing feed intake, growth performance, and nutrient utilization in fish feeding trials.

Evaluation of the Performance of HP-DDGS as a Fish Meal Replacement in Perch Feeds Conventional and dryfrac HP-DDGS from the above are analyzed for nutritional competencies in view of requirements of targeted species, especially focusing on yellow perch. Samples will be subjected to chemical analyses: proximate analysis, Van Soest fibers, insoluble carbohydrates, amino acids, fatty acids, and minerals. This ensures that nutritional benchmarks have been satisfied. Any antinutritional properties (e.g., phytic acid content) of HP-DDGS are compared with current DDGS and provide a basis for further process modification.

Complete practical diets are formulated using conventional and dryfrac HP-DDGS in accordance with known nutrient requirements for yellow perch (e.g., 32% protein, 8% lipid). Basal mineral and vitamin premixes for plant-based diets are used to ensure that micro-nutrient requirements are met. Any supplements (as deemed necessary by analysis) are evaluated by comparing to an identical formulation without supplementation; thus, the feeding trial is done in a factorial design to account for supplementation effects. All feeding trials include a fish meal-based control diet and diets containing graded levels of HP-DDGS. Pellets for feeding trials are produced using the lab-scale single screw extruder (BRABENDER PLASTI-CORDER EXTRUDER Model PL2000).

Replication of four experimental units per treatment are used in all feeding trials (60 to 120 days each). Trials are done in 110-L circular tanks (20 fish/tank) connected in parallel to a closed-loop recirculation system consisting of a solids sump, bioreactor, and filters (100 μm bag, carbon and ultra-violet) driven by a centrifugal pump. Heat pumps are used as required to maintain optimal temperatures for species-specific growth. Water quality (e.g., dissolved oxygen, pH, temperature, ammonia and nitrite) is monitored in all systems.

Experimental diets are delivered according to fish size, split into two-to-five daily feedings. Growth performance is determined by total mass measurements taken at one-to-four weeks (depending upon fish size and trial duration); rations are adjusted in accordance with gains to allow satiation feeding and to reduce waste streams. Consumption is assessed biweekly from collections of uneaten feed from individual tanks. Uneaten feed is dried to a constant temperature, cooled, and weighed to estimate conversion efficiency. Protein, energy, and phosphorous digestibility are determined from fecal material manually stripped during the midpoint of each experiment or via necropsy from the lower intestinal tract at the conclusion of a feeding trial. Survival, weight gain, growth rate, health indices, feed conversion, protein and energy digestibility, protein efficiency, and phosphorous utilization are compared among treatment groups. Proximate analysis of necropsied fish is done to compare composition of fillets among dietary treatments. Analysis of amino and fatty acids is done as needed for fillet constituents, according to the feeding trial objective.

Statistical analyses of diets and feeding trial responses are completed with an a priori α=0.05. Analysis of performance parameters among treatments is done with appropriate analysis of variance or covariance (Proc Mixed) and post hoc multiple comparisons, as needed. Analysis of fish performance and tissue responses are assessed by nonlinear models.

Determining Preliminary Mass Balance, Energy Requirements, and Costs.

Inputs and outputs of the conventional and dryfrac HP-DDGS conversion process are monitored and used to establish a process mass balance. Similarly, energy requirements for the process are measured and/or estimated to calculate total energy use. Together, these inputs are used to assess preliminary costs, which are compared to conventional and dryfrac HP-DDGS value.

All of the references cited herein are incorporated by reference in their entireties.

From the above discussion, one skilled in the art can ascertain the essential characteristics of the invention, and without departing from the spirit and scope thereof, can make various changes and modifications of the embodiments to adapt to various uses and conditions. Thus, various modifications of the embodiments, in addition to those shown and described herein, will be apparent to those skilled in the art from the foregoing description. Such modifications are also intended to fall within the scope of the appended claims.

We claim:

1. A composition comprising a soy protein concentrate from centrifuged solids of a fermented soybean containing feedstock, wherein the composition contains at least about 70% protein content by weight, significant cell mass from at least one fermenting microbe, pullulan, reduced raffinose and stachyose, and exhibits a higher palatability when contained in a feed for fish compared to a feed containing directly dried fermented soybean feedstock.

2. The composition of claim 1, wherein the oligosaccharides are present n an amount of between about 0.00 g/100 g to about 0.24/100 g on a dry matter basis.

3. The composition of claim 1, wherein the at least one microbe is an *Aureobasidium pullulan* strain.

4. The composition of claim 3, wherein the *A. pullulans* strain is selected from the group consisting of NRRL No. 50792, NRRL No. 50793, NRRL No. 50794, NRRL No. 50795.

5. The composition of claim 1, wherein the composition exhibits a light color indicative of low caramelization and fewer Maillard reactions of the free amino groups and available sugars compared to the same composition having a darker color.

6. The composition of claim 1, wherein the composition is contained in a feed or foodstuff, wherein the feed or foodstuff comprises phytase and wherein the feed or foodstuff comprises reduced phytic acid compared to the soybean feedstock from which it is derived.

7. A feed or foodstuff comprising the composition of claim 1.

8. The feed or foodstuff of claim 7, wherein said feed provides about 35% to about 100% of the protein source in said feed.

9. The feed or foodstuff of claim 8, wherein said composition is a complete replacement for animal-protein in a feed or foodstuff.

10. The feed or foodstuff of claim 7, wherein said feed or foodstuff is formulated for fish, crustaceans, cattle, poultry, swine, goats, sheep, cats, dogs, horses, or a combination thereof.

11. The feed or foodstuff of claim 7, wherein said foodstuff is formulated for humans.

12. The composition of claim 1, wherein soybean feedstock consists of GMO, non-GMO soybeans or a combination thereof.

* * * * *